United States Patent
Muramatsu et al.

[11] Patent Number: 6,055,317
[45] Date of Patent: Apr. 25, 2000

[54] ACTIVE VIBRATION DAMPING DEVICE HAVING PNEUMATICALLY OSCILLATED MASS MEMBER WHOSE OSCILLATION AMPLITUDE AS WELL AS FREQUENCY AND PHASE ARE CONTROLLABLE

[75] Inventors: Atsushi Muramatsu; Yoshihiko Hagino, both of Komaki, Japan

[73] Assignee: Tokai Rubber Industries, Ltd., Komaki, Japan

[21] Appl. No.: 09/239,347

[22] Filed: Jan. 28, 1999

[30] Foreign Application Priority Data

Feb. 10, 1998 [JP] Japan .................................. 10-028105

[51] Int. Cl.$^7$ ............................ A61F 11/06; G10K 11/16; F16F 5/00; F16M 7/00
[52] U.S. Cl. ..................... 381/71.4; 381/86; 267/140.13; 267/140.14
[58] Field of Search .................................. 381/71.4, 71.7, 381/71.8, 71.13, 86, 94.7, FOR 123, FOR 124, 162, 164, 165; 415/119; 267/140.13, 140.14, 140.15, 140.11; 188/378, 379, 380

[56] References Cited

U.S. PATENT DOCUMENTS

| | | |
|---|---|---|
| 4,415,148 | 11/1983 | Mair et al. . |
| 4,643,405 | 2/1987 | Hofmann et al. ........................ 188/379 |
| 4,645,189 | 2/1987 | Quast ....................................... 188/379 |
| 4,721,288 | 1/1988 | Andrä et al. . |
| 4,779,853 | 10/1988 | Sugino et al. ......................... 267/140.1 |
| 4,840,358 | 6/1989 | Hoying et al. ....................... 267/140.14 |
| 4,850,578 | 7/1989 | Katayama et al. ...................... 188/379 |
| 4,854,560 | 8/1989 | Lun . |
| 5,145,156 | 9/1992 | Muramatsu et al. ................ 267/140.14 |
| 5,170,998 | 12/1992 | Muramatsu ......................... 267/140.13 |
| 5,215,293 | 6/1993 | Muramatsu et al. ................ 267/140.14 |
| 5,215,294 | 6/1993 | Muramatsu et al. ................ 267/140.13 |
| 5,246,212 | 9/1993 | Funahashi et al. ................. 267/140.13 |
| 5,255,764 | 10/1993 | Kurabayashi et al. .................. 188/380 |
| 5,314,173 | 5/1994 | Ide et al. ............................. 267/140.14 |
| 5,388,812 | 2/1995 | Kojima et al. ...................... 267/140.14 |
| 5,427,362 | 6/1995 | Schilling et al. ................... 267/140.14 |
| 5,437,438 | 8/1995 | Takano et al. ...................... 267/140.14 |
| 5,520,375 | 5/1996 | Leibach et al. ..................... 267/140.14 |
| 5,628,499 | 5/1997 | Ikeda et al. ......................... 267/140.14 |
| 5,704,596 | 1/1998 | Smith et al. ........................ 267/140.11 |
| 5,769,402 | 6/1998 | Ide et al. ............................. 267/140.14 |
| 5,941,500 | 8/1999 | Muramatsu et al. ................ 267/140.13 |
| 5,967,500 | 10/1999 | Satori et al. ........................ 267/140.13 |
| 5,992,833 | 11/1999 | Tanahashi .......................... 267/140.14 |

FOREIGN PATENT DOCUMENTS

| | | |
|---|---|---|
| 0851146 | 7/1998 | European Pat. Off. .......... 267/140.14 |
| 61-59035 | 3/1986 | Japan . |
| 3-292219 | 12/1991 | Japan . |
| 5-223139 | 8/1993 | Japan ................................ 267/140.14 |
| 6-235438 | 8/1994 | Japan . |
| 10-238587 | 9/1998 | Japan . |

*Primary Examiner*—Forester W. Isen
*Assistant Examiner*—Xu Mei
*Attorney, Agent, or Firm*—Wall Marjama Bilinski & Burr

[57] ABSTRACT

A pneumatically operated active vibration damping device comprising a mounting member attachable to an object whose vibration is to be damped, a mass member elastically connected to the mounting member such that the mass member can be oscillated based on a periodic change of an air pressure in an air chamber connected to an air piping system, an active damping switch valve which is connected to the air piping system and which is operable for selective connection of the air chamber to a vacuum source and an atmosphere, to control a frequency and a phase of an oscillation of the mass member, and a pressure regulating switch valve connected to the air piping system, for alternately connecting and disconnecting the air chamber to and from the vacuum source and/or said atmosphere, so as to regulate a magnitude of said periodic change of said air pressure in said air chamber, for adjusting an amplitude of said oscillation of the mass member.

14 Claims, 9 Drawing Sheets

ACTIVE VIBRATION DAMPING DEVICE HAVING PNEUMATICALLY OSCILLATED MASS MEMBER WHOSE OSCILLATION AMPLITUDE AS WELL AS FREQUENCY AND PHASE ARE CONTROLLABLE

This application is based on Japanese Patent Application No. 10-28105 filed Feb. 10, 1998, the content of which is incorporated hereinto by reference.

BACKGROUND OF THE INVENTION

1. Field of the Invention

This invention relates in general to an active vibration damping device which is mounted on a desired object whose vibration is to be damped, for actively damping vibration of this object. More particularly, the present invention is concerned with a pneumatically operated active vibration damping device which includes a mass member which is oscillated by a periodic change of an air pressure applied thereto, for applying an oscillating force to the object so as to provide an active vibration damping effect.

2. Discussion of the Related Art

A dynamic damper is widely known, as a vibration damping device for damping vibration of a desired object such as the body of an automotive vehicle, whose vibration is to be damped. In recent years, there has been proposed an active vibration damping device including a mass member which is oscillated to apply an oscillating force to the object, for thereby exhibiting an improved active vibration damping effect. An example of this active vibration damping device is disclosed in JP-A-3-292219 and JP-A-6-235438, wherein a vibration system is constituted by a mounting member for attachment to the object, a spring member, and a mass member connected to the mounting member through the spring member. This active vibration damping device includes an electromagnetic actuator mechanism for oscillating the mass member of the vibration system, so as to provide an increased active damping effect with respect to the object, based on the oscillation of the mass member.

There is also proposed an active vibration damping device of another type wherein the mass member is exposed to an air chamber formed between the mounting member and the mass member, so that the mass member is oscillated by a periodic change of the air pressure in the air chamber, at a frequency corresponding to the frequency at which a switch valve is alternately placed in two operating positions, namely, a "vacuum position" for communication of the air chamber with a vacuum source, and an "atmospheric position" for communication of the air chamber with the atmosphere. This pneumatically operated type of active vibration damping device does not require a heavy member such as an electromagnetic actuator to be incorporated therein, resulting in reduction in the number of the required components, the size and weight and the required amount of electric power consumption of the device.

In the pneumatically operated type of active vibration damping device, it is important and desirable to control the switch valve and the negative pressure in the air chamber so that not only the frequency and phase but also the amplitude of the oscillation of the mass member correspond to those of the vibration of the object to be damped, in order to improve the active damping effect with respect to the vibration of the object.

To meet the need indicated above, the inventors of the present invention have considered it possible to (a) detect the frequency, phase and amplitude of the vibration of the object, by using a suitable sensor such as an accelerometer or acceleration sensor, or estimate those frequency, phase and amplitude according to predetermined data maps, (b) control the frequency and phase of the switching operation of the switch valve, so that the frequency and phase of the oscillation of the mass member correspond to those of the vibration of the object, and (c) control the negative pressure in the air chamber so that the amplitude of the oscillation of the mass member corresponds to that of the vibration of the object.

Where the pneumatically operated active vibration damping device is used for an automotive vehicle, and the air intake system of the engine of the vehicle is used as the vacuum source, it is difficult to regulate the negative pressure in the air intake system (vacuum source), and is therefore difficult to obtain the oscillation of the mass member whose amplitude corresponds to that of the vibration of the object to be damped. The active vibration damping device does not provide a sufficiently high active vibration damping effect, or may even deteriorate the vibrating condition of the object, if the amplitude of the oscillation of the mass member does not accurately correspond to that of the vibration of the object.

In the light of the above, the inventors have also considered it possible to control the level of the negative pressure in the air chamber depending upon the amplitude of the vibration of the object, by controlling the duty ratio of the switch valve based on the amplitude of the vibration of the object. The duty ratio of the switch valve is interpreted to mean a ratio of a time in which the switch valve is held in its vacuum or atmospheric position, to the entire period of the switching operation of the switch valve. Where the amplitude of the oscillation of the object is considerably small or large, the duty ratio of the switch valve is considerably smaller or larger than the intermediate value of 0.5, in order to obtain the oscillation amplitude of the mass member which corresponds to the vibration amplitude of the object. However, an extensive analysis by the present inventors regarding this duty-ratio control of the switch valve has, revealed that a duty ratio value of the switch valve which is considerably smaller or larger than the intermediate value of 0.5 would cause a considerably large amount of distortion or deviation of the waveform of the oscillation of the mass member (waveform of the active damping force acting on the object), with respect to the waveform of the vibration of the object to be damped, causing generation of higher harmonics components of the primary frequency of the oscillation (higher harmonics components of the frequency of the vibration to be damped).

SUMMARY OF THE INVENTION

It is therefore an object of this invention to provide a pneumatically operated active vibration damping device which permits oscillation of the mass member whose frequency, phase and amplitude accurately correspond to those of the vibration of a desired object, while minimizing the generation of higher harmonics components of the frequency of the vibration of the object.

The above object may be achiever according to the principle of the present invention, which provides a pneumatically operated active vibration damping device comprising: (a) a mounting member attachable to an object whose vibration is to be damped; (b) a mass member elastically connected to the mounting member such that the mass member can be oscillated based on a periodic change of an air pressure in an air chamber connected to an air piping system; (c) an active damping switch valve which is connected to the air piping system and which is operable for selective connection of the air chamber to a vacuum source and an atmosphere, to control a frequency and a phase of an oscillation of the mass member; and (d) a pressure regulating switch valve connected to the air piping system, for alternately connecting and disconnecting the air chamber to and from the vacuum source and/or the atmosphere, so as to regulate a magnitude of the periodic change of the air pressure in the air chamber, for thereby adjusting an amplitude of the oscillation of the mass member.

In the pneumatically operated active vibration damping device constructed according to the above mode of the present invention, the magnitude of the periodic change of the air pressure induced in the air chamber can be controlled by the pressure regulating switch valve, even where the negative pressure of the vacuum source cannot be directly regulated. Accordingly, the amplitude of the oscillation of the mass member can be controlled so as to provide a high active damping effect with respect to the vibration of the object, by suitably controlling the switching operation of the pressure regulating switch valve depending upon the amplitude of the vibration of the object.

Since the amplitude of the oscillation of the mass member to be transmitted to the object is controlled by the pressure regulating switch valve, only the frequency and phase of the switching operation of the active damping switch valve are required to be controlled depending upon the frequency and phase of the vibration of the object. In other words, the duty ratio of the active damping switch valve need not be controlled depending upon the amplitude of the vibration of the object to be damped. Accordingly, the duty ratio of the active damping switch valve need not be made extremely high or low even when the required amplitude of the oscillation of the mass member is considerably small or large. Therefore, the provision of the pressure regulating switch valve prevents significant distortion or deviation of the waveform of the oscillation of the mass member with respect to that of the waveform of the vibration of the object, thereby minimizing generation of higher harmonics components of the frequency of the vibration of the object, resulting in improved effect and stability of active damping with respect to the vibration of the object.

The mass member may be elastically connected to the mounting member by a suitable elastic body, such as a rubber body, or a metallic spring like a sheet spring. Thus, the present active vibration damping device has a vibration system which consists of a mass in the form of the mass member, and a spring in the form of the elastic body which elastically connects the mass member to the mounting member. To improve the damping effect of the present active vibration damping device, this vibration system is preferably tuned so that the natural frequency of the vibration system is equal to the frequency of the vibration of the object to be damped. In this case, the damping effect is improved owing to the resonance of the vibration system.

Air conduits made of a suitable material may be used in the air piping system. However, it is desirable to use the air conduits which permit efficient transmission of air pressure to the air chamber, without air leakage or a considerable degree of deformation of the conduits. The active damping switch valve may be any switch valve capable of performing a switching operation within a range of frequency of the vibration of the object to be damped. In particular, a solenoid-operated switch valve is preferably used as the active damping switch valve, for improved response and ease of control of the switching operation. The active damping switch valve may consist of a combination of two or more directional control valves for selective communication of the air chamber with the vacuum source and the atmosphere. For simpler construction and control, it is preferable to use a three-port (three-way) directional control valve, particularly, a solenoid-operated valve of spool or rotary type. The switching operation of the active damping switch valve is generally controlled so that the waveform of the oscillation of the mass member has a phase difference of 180° with respect to the waveform of the vibration of the object, namely, so that the oscillation of the mass member offsets the vibration of the object. For instance, the active damping switch valve is controlled in an adaptive control or other feedback control manner, on the basis of the frequency and phase of the vibration of the object as detected by a suitable sensor such as an accelerometer, with the transfer function taken in account, so that the frequency of the oscillation of the mass member is the same as that of the vibration of the object while the phase of the oscillation is shifted by 180° with respect to that of the vibration of the object. Alternatively, the active damping switch valve may be controlled in an open-loop fashion, on the basis of detected parameters representative of the frequency and phase of the vibration of the object, and according to stored predetermined data maps which are obtained by experimentation and which represent relationships between the frequency and phase of the vibration of the object and those of the oscillation of the mass member (those of the switching operation of the switch valve).

The pressure regulating switch valve is operated to alternately connect and disconnect the air chamber to and from only the vacuum source, only the atmosphere or both of the vacuum source and the atmosphere, depending upon the location of this valve in the air piping system. The pressure regulating switch valve may be adapted to effect complete connection and disconnection to and from the vacuum source and/or the atmosphere, or change the cross sectional area of flow of the air through the air piping system to the air chamber in two steps. In the latter case, the air chamber is substantially connected to the vacuum source or the atmosphere when the cross sectional area of flow of the air is increased, and is substantially disconnected therefrom when the cross sectional area of flow of the air is reduced. Alternatively, the pressure regulating switch valve may be connected to a portion of the air piping system between the air chamber and the vacuum source, so that the air piping system is open to the atmosphere at that portion when the valve is opened. In this case, the air chamber is substantially disconnected from the vacuum source when the valve is open, and is substantially connected to the vacuum source when the valve is closed. While the pressure regulating switch valve may be a three-port directional flow control valve, depending upon the location of the valve, the valve is preferably a two-port switch valve of poppet, spool or rotary type, which is desirably a solenoid-operated valve having a high control response.

The pressure regulating switch valve may be located between a portion of the air piping system between the air chamber and the active damping switch valve, where the frequency of the switching operation of the valve is selected to be sufficiently higher than that of the active damping switch valve, in order to reduce the generation of higher harmonics components of the primary frequency of the oscillation of the mass member. However, the pressure regulating switch valve is preferably connected to a portion of the air piping system between the active damping switch valve and the vacuum source or the atmosphere. In this arrangement, the required length of the air piping system between the active damping switch valve and the air chamber can be shortened, the periodic change of the air pressure in the air chamber can be controlled with improved accuracy, so that the accuracy of control of the oscillating force acting on the mass member is accordingly improved. Further, the length of the portion of the air piping system between the pressure regulating switch valve and the air chamber can be increased, making it possible to reduce or prevent undesirable transmission of the air pressure change due to the switching operation of the pressure regulating switch valve, to the air chamber, which would cause distortion of the waveform of the oscillation of the mass member, which in turn would cause generation of higher harmonics components of the primary frequency of the oscillation, that is, higher harmonics components of the frequency of the vibration to be damped.

Where the pressure regulating switch valve is disposed in an atmospheric conduit of the air piping system which is between the active damping switch valve and the atmosphere, the atmospheric conduit communicating with the atmosphere is alternately opened and closed by the pressure regulating switch valve, so that an average value of the air pressure in the air chamber is made lower ((closer to the negative pressure of the vacuum source) than in the case where the pressure regulating switch valve is not provided. Accordingly, the spring stiffness of the elastic body elastically connecting the mass member to the mounting member is increased, whereby the operating response of the damper unit is accordingly improved, permitting accurate control of the oscillating force to be applied to the mass member even when the vibration of the object has a relatively high frequency. Thus, the present active vibration damping device is capable of exhibiting a high active damping effect with respect to the high-frequency vibration.

Where the pressure regulating switch valve is disposed in a vacuum conduit of the air piping system which is between the active damping switch valve and the vacuum source, the vacuum conduit communicating with the vacuum source is alternately opened and closer by the pressure regulating switch valve, so that an average value of the air pressure in the air chamber is made higher (closer to the atmospheric pressure) than in the case where the switch valve is not provided. Accordingly, ar average value of elastic strain of the elastic body elastically connecting the mass member to the mounting member is reduced, resulting in improved durability of the elastic body. The location of the pressure regulating switch valve in the vacuum conduit has another advantage where the active vibration damping device includes a damper unit which has a liquid chamber filled with a non-compressible fluid as well as the air chamber. That is, the provision of the pressure regulating switch valve in the vacuum conduit is effective to prevent a flow of the non-compressible fluid from the air chamber into the vacuum source (such as a vacuum pump, or an internal combustion engine of an automotive vehicle), even in the event of an entry of the fluid into the air chamber for some reason or other, if an accumulator is provided in connection with the vacuum conduit.

In the present active vibration damping device wherein the magnitude of the oscillating force to be applied to the mass member is controlled by the switching operation of the pressure regulating switch valve, it is not necessary to control the duty ratio of the active damping switch valve depending upon the amplitude of the vibration of the object to be damped. However, the present active vibration damping device preferably comprises an active damping valve controller for controlling a switching operation of the active damping switch valve such that the air chamber is alternately connected to the vacuum source and the atmosphere, at a frequency and phase corresponding to those of the vibration of the object, and such that a ratio of a time of connection of the air chamber to each of the vacuum source and the atmosphere, to a period of the switching operation is held within a range between 0.4 and 0.6. The provision of the active damping valve controller for controlling the active damping switch valve as described above makes it possible to effective prevent generation of higher harmonics components of the primary frequency of the oscillation of the mass member (which corresponds to the frequency of the vibration of the object to be damped). The above-indicated ratio (referred to as "duty ratio") of the active damping switch valve may be suitably selected within the range of 0.4–0.6, so as to minimize the higher harmonics components, that is, the frequency components which deviate from the frequency of the vibration of the object to be damped. Since the vibration of the object generally has a waveform similar to a sine wave, it is effective to set the duty ratio of the active damping switch valve to be about 0.5. While this duty ratio may be a constant value selected within the range of 0.4–0.6, it may be changed depending upon the characteristics of the specific vibration of the object to be damped.

The magnitude of the periodic change of the air chamber in the air chamber may be regulated by suitably controlling the frequency of a switching operation of the pressure regulating switch valve to alternately connect and disconnect the air chamber to and from the vacuum source and/or the atmosphere. However, the active vibration damping device preferably comprises a first pressure regulating switch valve controller for controlling a switching operation of the pressure regulating switch valve to alternately connect and disconnect the air chamber to and from the vacuum source and/or the atmosphere, such that a ratio of a time of communication of the pressure regulating switch valve with the vacuum source and/or the atmosphere, to a period of the switching operation of the pressure regulating switch valve changes depending upon an amplitude of the vibration of the object. The provision of this first pressure regulating switch valve controller adapted to control the above-indicated ratio (referred to as "duty ratio") of the pressure regulating switch valve as described above permits accurate and easy control of the magnitude of the periodic change of the air pressure in the air chamber and the amplitude of the oscillation of the mass member. Further, the frequency of the switching operation of the pressure regulating switch valve can be selected as desired.

The present active vibration damping device preferably comprises a second pressure regulating switch valve controller for controlling a switching operation of the pressure regulating switch valve such that the air chamber is alternately connected and disconnected to and from the vacuum source and/or the atmosphere, at a frequency which is higher than and is not harmonious with a frequency of a switching operation of the active damping switch valve to alternately connect the air chamber to the vacuum source and the atmosphere. The provision of this second pressure regulating switch valve controller adapted to control the pressure regulating switch valve as described above is effective to prevent the generation of higher harmonics components of the primary frequency of the oscillation of the mass member, which components world otherwise be generated due to the switching operation of the pressure regulating switch valve. Accordingly, the active vibration damping device exhibits an improved active damping effect with respect to the vibration of the object. While the frequency of the switching operation of the pressure regulating switch valve may be a fixed value, it may be changed with a change in the frequency of the switching operation of the active damping switch valve, which changes depending upon the frequency of the vibration of the object. The frequency of the switching operation of the pressure regulating valve which is not harmonious with that of the active damping switch valve is interpreted to mean the frequency value which does not have a common divisor with respect to the frequency value of the switching operation of the active damping switch valve and which does not cause resonance of the switch operation of the pressure regulating switch valve with the switching operation of the active damping switch valve. Where the frequency of the vibration of the object is within a range of 30–50 Hz, for instance, the frequency of the switching operation of the pressure regulating switch valve is required to be higher than 50 Hz, and may be determined to be lower than 60 Hz, in order to meet the second requirement that the frequency of the switch operation of the pressure regulating switch valve be not harmonious with the frequency of the switching operation of the active damping switch valve.

Preferably, the present active vibration damping device further comprises pressure variation reducing means disposed in a portion of the air piping system which is between the active damping switch valve and the pressure regulating switch valve, for reducing an amount of variation of the air pressure in the air chamber which arises from a switching operation of the pressure regulating switch valve. The pressure variation reducing means is effective to reduce the amount of variation of the air pressure in the air chamber, which may arise from the switching operation of the pressure regulating switch valve to alternately connect and disconnect the air chamber to and from the vacuum source and/or the atmosphere. Accordingly, the pressure variation reducing means is effective to prevent a periodic change of the air pressure in the air chamber, whose frequency does not correspond to the frequency of the vibration of the object. Thus, the pressure variation reducing means improves the active vibration damping effect of the damping device. The pressure variation reducing means may be selected from various means known in the art for reducing a pressure variation, and is desirably adapted to effectively accommodate or absorb an air pressure variation whose frequency is close to the frequency of the switching operation of the pressure regulating switch valve. For instance, the pressure variation reducing means is preferably selected from among various types of surge tank or accumulator, or various types of muffler or silencer. The accumulator may be of a diaphragm type, a piston type, a spring type, a weight type, a rubber tube type or a direct type. The muffler or silencer may be of a side branch type, a resonance type, a resonance box type, a resonance muffler type, a cavity muffler type, an interference muffler type or a blower muffler type. The pressure variation reducing means may consist of a combination of two or more of the above-indicated accumulators (surge tanks) and mufflers (silencers). Where the pressure variation reducing means is located between the pressure regulating switch valve and the vacuum source or the atmosphere, the pressure variation reducing means is desirably connected to a vacuum conduit communicating with the vacuum source or an atmospheric conduit communicating with the atmosphere. The provision of the pressure variation reducing means permits easy and accurate control of the oscillation of the mass member such that the amplitude, frequency and phase of the waveform of the oscillation correspond to those of the vibration of the object, so as to provide a high active damping effect with respect to the vibration, even if the frequency of the switching operation of the pressure regulating switch valve is made lower than that of the active damping switch valve, even if the duty ratio of the pressure regulating switch valve deviates from the value of 0.5 to a value close to the value of 0 or 1.0, or even if the duty ratio of the pressure regulating switch valve or active damping switch valve changes at a high rate.

An actuator using a vacuum source is generally equipped with an accumulator or surge tank. Where the present active vibration damping device is used in a system including such an actuator, the accumulator or surge tank of that system may be utilized as the pressure variation reducing means. In this case, the active vibration damping device does not require an exclusive pressure variation reducing means.

In the present pneumatically operated active vibration damping device, the mass member may be oscillated directly by the periodic change of the air pressure in the air chamber. However, the mass member may be oscillated by a periodic change of a non-compressible fluid in a liquid chamber, which is caused by the periodic change of the air pressure in the air chamber. In this case, the active vibration damping device preferably further comprises a flexible diaphragm which partially define, the air chamber and a liquid chamber on opposite sides thereof, respectively. The liquid chamber being filled with a non-compressible fluid, and the periodic change of the air pressure in the air chamber causes the flexible diaphragm to be elastically oscillated, so as to cause a periodic change of a pressure of the non-compressible fluid in the liquid chamber, so that the mass member is oscillated by the periodic change of the pressure of the non-compressible fluid. This arrangement makes it possible to reduce the required volume of the air chamber and accordingly improve the operating response, and permits a relatively large oscillating force acting on the mass member with a relatively small amount of the periodic change of the air pressure in the air chamber, owing to amplification of the oscillating force based on the pressure of the non-compressible fluid according to the Pascal's principle.

The liquid chamber indicated above preferably consists of a working liquid chamber which is partially defined by the flexible diaphragm and to which the periodic change of the air pressure in the air chamber is transmitted through the flexible diaphragm, and an oscillating liquid chamber which communicates with the working liquid chamber through an orifice passage. In this arrangement, a periodic change of the pressure of the non-compressible fluid in the working liquid chamber is transmitted to the oscillating liquid chamber through flows of the fluid through the orifice passage, so as to cause a periodic change of the pressure of the fluid in the oscillating chamber, for thereby oscillating the mass member. This arrangement permits effective generation of the oscillating force acting on the mass member, based on the resonance of the non-compressible fluid flowing through the orifice passage.

In the above arrangement wherein the liquid chamber consists of the working and oscillating liquid chambers, the active vibration damping device may further comprise an elastic body which elastically connects the mass member to the mounting member and which partially defines the oscillating liquid chamber.

The pneumatically operated present active vibration damping device may further comprise an elastic body which elastically connects the mass member to the mounting member, and the elastic body and the mass member cooperate to constitute a vibration system in a damper unit which is attachable at the mounting member to the object and which has the air chamber connected to the active damping switch valve and the pressure regulating switch valve through the air piping system.

The present pneumatically operated active vibration damping device is suitable used for actively damping the vibration of the body of an automotive vehicle having an internal combustion engine, which provides the vacuum source.

BRIEF DESCRIPTION OF THE DRAWINGS

The above and optional objects, features, advantages and industrial and technical significance of this invention will further clarified by reading the following detailed description of presently preferred embodiments or forms of the invention, by reference to the accompanying drawings, in which.

DETAILED DESCRIPTION OF THE PREFERRED EMBODIMENTS

Figure 1:
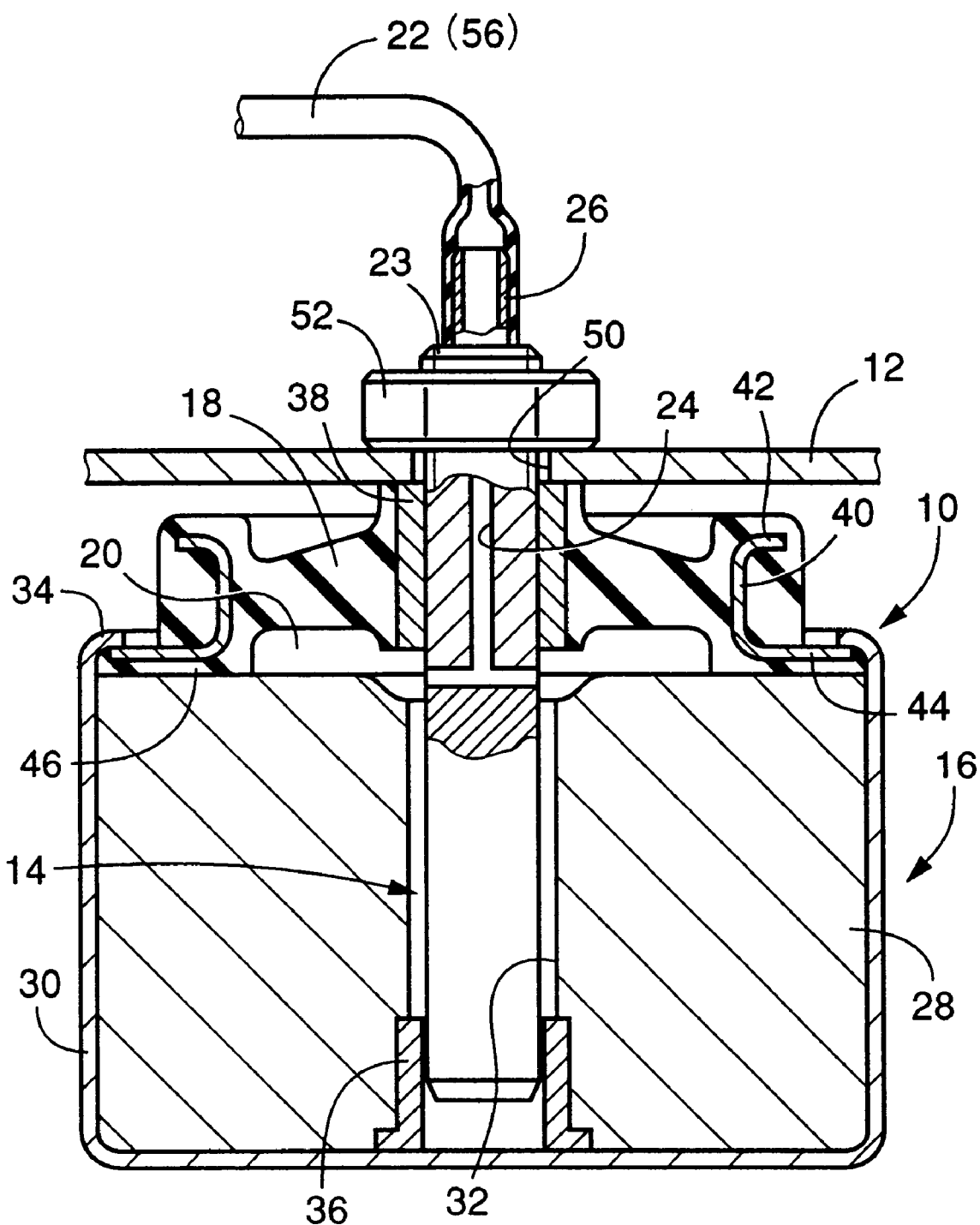
FIG. 1 is an elevational view in axial cross section of a damper unit of a pneumatically operated active vibration damping device constructed according to a first embodiment of this invention.
Figure 2:
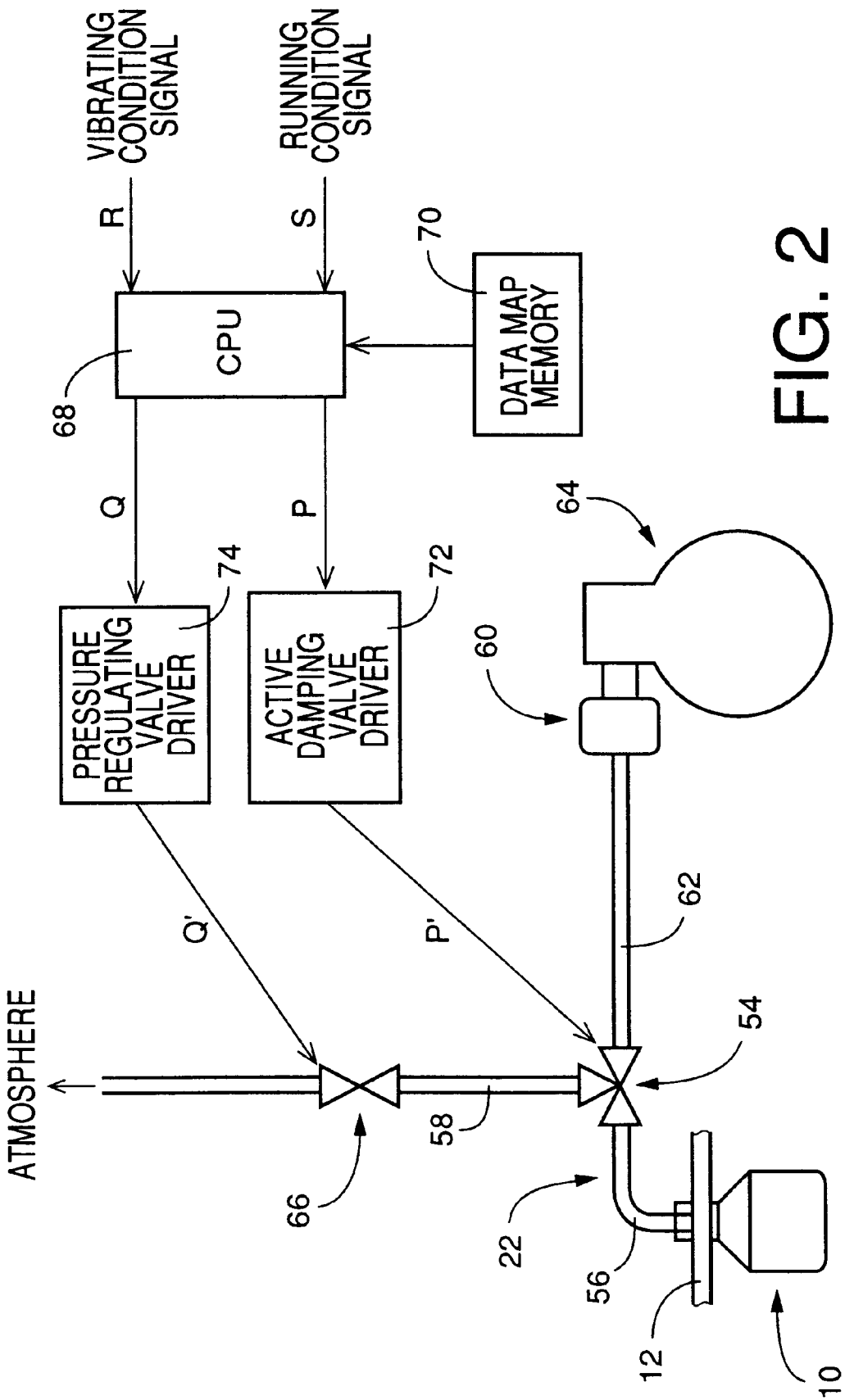
FIG. 2 is a view schematically illustrating the pneumatically operated active vibration damping device of FIG. 1, together with a vacuum source used for the device.

Referring first to FIGS. 1 and 2, the pneumatically operated active vibration damping device constructed according to a first embodiment of the present invention includes a damper unit 10 of FIG. 1, and an air piping system 22 connecting the damper unit 10 to a vacuum source 60 and the atmosphere, as shown in FIG. 2. The active vibration damping device further includes control valves and a control system for controlling the control valves, as described below in detail. It is noted that any pneumatically operated active vibration damping device according to the principle of the the present invention does not include the air source 60.

The air piping system 22, control valves and control system are arranged to generate a periodic air pressure change within the damper unit 10, using the atmospheric pressure and the negative pressure of the vacuum source 60, so as to provide an active vibration damping effect, with respect to a desired object whose vibration is to be damped. In the present first embodiment, the desired object is a vibratile body 12, which may be the body of an automotive vehicle.

As shown in FIG. 1, the damper unit 10 includes a mounting member 14 of bolt type, at which the damper unit 10 is attached to or mounted on the vibratile body 12 whose vibration is to be damped. The damper unit 10 further includes a mass member 16, and an elastic body 18 through which the mass member 16 is elastically connected to the mounting member 14, so as to permit a relative displace of the mounting member 14 and the mass member 16 in the axial direction of the mass member 14. Thus, the damper unit 10 has a vibration system consisting of a mass in the form of the mass member 16 and a spring in the form of the elastic body 18. The mounting member 14, the mass member 16 and the elastic body 18 cooperate to define an air chamber 20 which communicates with the air piping system 22, as described below.

The air pressure in the air chamber 20 is periodically changed by the control valves (which will be described) through the air piping system 22, so as to cause oscillation of the mass member 16 relative to the mounting member 14, for applying an active damping oscillating force to the vibratile body 12 based on the oscillation of the mass member 16, and thereby providing an active damping effect with respect to the vibration of the vibratile body 12. The damper unit 10 is adapted to exhibit a high active damping effect with respect to the vibration of the vibratile body 12 which is applied in the vertical direction as viewed in FIG. 1.

The mounting member 14 is a solid rod with a relatively small diameter, which includes a bolt portion 23, that is, an externally threaded upper end portion 13 (on the side of the vibratile body 12). The mounting member 14 has an air passage 24 formed so as to extend in the axial direction through the bolt portion 23 up to an axially intermediate portion thereof. This air passage 24 is open in the outer circumferential surface at the axially intermediate portion of the mounting member 14, so that the air passage 24 communicates with the air chamber 20. The mounting member 14 has a connector 26 integrally formed at the upper end of the bolt portion 23, so as to extend upwards from the upper end, so that the air passage 24 is connected to the air piping system 22 through the connector 26.

The mass member 16 consists of a cylindrical solid metallic core 28 having a relatively large diameter, and a thin-walled cylindrical hollow metallic covering 30 in which the core 28 is fixedly received. The core 28 is made of a ferrous metal or other metallic material having a sufficiently high specific gravity. The hollow covering 30 is closed at one of its opposite axial ends, and is fitted on the solid core 28 through the opening at the other end. The core 28 has a central guide hole 32 formed therethrough in the axial direction. The central guide hole 32 is closed at its lower end by the bottom wall of the covering 30. The covering 30 has a calked portion 34 at its upper open end. The calked portion 34 is calked onto the peripheral portion of the upper end face of the core 28.

The lower portion of the mounting member 14 is inserted into the guide hole 32 of the mass member 16, in coaxial or concentric relationship with the mass member 16. It is noted that the diameter of the guide hole 32 formed in the core 28 is slightly larger than the outside diameter of the mounting member 14, so that there is left a small amount of clearance between the mounting member 14 and the inner circumferential surface of the guide hole 32. This clearance permits a relative displace between the mass member 16 and the mounting member 14 in the axial direction of the cylindrical mass member 16 (in the axial direction of the damper unit 10). In the lower end portion of the guide hole 32 of the mass member 16, there is fixedly disposed a guide sleeve 32 so that the lower end portion of the mounting member 14 is axially slidably guided by the guide sleeve 32, with a small resistance of friction therebetween. The guide sleeve 32 also functions to prevent abutting contact of the lower end portion of the mounting member 14 with the inner circumferential surface of the guide hole 32, which would occur due to an otherwise possible relative displace of the mounting member 14 and the mass member 16 in the radial direction.

The elastic body 18 elastically connecting the mounting member 14 and the mass member 16 generally takes the form of an annular plate, which carries a metal sleeve 38 bonded to its inner circumferential surface, and a connecting metal member 40 almost entirely embedded in a radially outer portion thereof. The metal sleeve 38 and the connecting metal member 40 are bonded to and embedded in the annular plate of the elastic body 18 in the process of vulcanization of a rubber material to form the elastic body 18. The metal sleeve 38 has a relatively small diameter, and is fixed mounting on the relatively upper portion of the mounting member 14, such that the elastic body 18 extends from the mounting member 14 in the radial direction. The metal sleeve 38 is positioned relative to the mounting member 14 in the axial direction such that the lower end face of the metal sleeve 38 is located above the lower end of the air passage 24 open in the air chamber 20, and such that sufficient fluid tightness is maintained between the metal sleeve 38 and the mounting member 14.

The connecting metal member 40 is a generally cylindrical member having a relatively large diameter and upper and lower flanges 42, 44 formed at its axially opposite ends so as to extend in the radially outward direction. The connecting metal member 40 is embedded in the radially outer portion of the elastic body 18, except the radially outer portion of the lower flange 44 which extends from the outer circumferential surface of the elastic body 18 in the radially outward direction. The above-indicated calked portion 34 of the covering 30 of the mass member 16 is pressed against the upper end face of the core 28 via the radially outer portion of the lower flange 44. In this arrangement, the lower flange 44 is gripped by and between the calked portion 34 and the core 28, so that the mass member 16 is fixed to the connecting metal member 40 of the elastic body 18. It is noted that fluid tightness between the mass member 1y and the connecting metal member 40 is obtained by a sealing rubber layer 46 interposed and squeezed therebetween.

As described above, the elastic body 18 is fixed at its radially inner end to the mounting member 14, and at its radially outer portion to the mass member 16, so that the mass member 16 is elastically connected to the mounting member 14 through the elastic body 18, such that the air chamber 20 is defined by the mounting member 14, mass member 16 and elastic body 18. In this respect, it is noted that the air chamber 20 communicates with the guide hole 32, more precisely, with the clearance between the mounting member 14 and the inner circumferential surface of the guide hole 32. In this sense, the air chamber 20 may be considered to include the above-indicated clearance. As indicated above, the air chamber 20 is held in communication with the air passage 24.

The damper unit 10 constructed as described above is attached to the vibratile body 12, such that the mounting member 14 is inserted at its bolt portion 23 into a mounting hole 50 formed through the vibratile body 12, while a nut 52 is screwed on the bolt portion 23, so that the vibratile body 12 is gripped by and between the nut 52 and the metal sleeve 38 fixedly mounted on the mounting member 14, as shown in FIG. 1. Thus, the damper unit 13 is attached at its mounting member 14 to the vibratile body 12. In this state of attachment of the damper unit 10 to the vibratile body 12, the mass member 16 is displaceable relative to the mounting member and therefore to the vibratile body 12 in the vertical direction as seen in FIG. 1, so that the vibration of the vibratile body 12 in the vertical direction can be effective damped by the present active vibration damping device including the damper unit 10.

The air piping system 22 is connected to the connector 26 provided on the mounting member 14, for generating a periodic change in the air pressure in the air chamber 20, so that the mass member 16 is oscillated relative to the mounting member 14 in the axial direction, namely, alternately moved toward and away from the vibratile body 12. The air piping system 22, and the above-indicated control valves and control system for activating the damper unit 10 will be described by reference to FIG. 2.

The control valves are connected to the air piping system 22, for pneumatically activating the damper unit 10, while the control system electrically controls these control valves. The control valves consist of an active damping switch valve 54, and a pressure regulating switch valve 66. The active damping switch valve 54 is a three-port directional control valve having a first port connected to a damper-side conduit 56 communicating with the damper unit 10, a second port connected to an atmospheric conduit 58 communicating with the atmosphere, and a third port connected to a vacuum conduit 62 connected to a vacuum source 60. The vacuum source 60 may be a vacuum tank communicating with the air intake system of an internal combustion engine 64 of the automotive vehicle, or a vacuum pump which is driven by the internal combustion engine 64.

The active damping switch valve 54 may be a two-position or three-position switch valve arranged to connect the first port selectively to the second or third port. Preferably, the active damping switch valve 54 is a solenoid-operated switch valve of poppet or spool type which permits a switching operation at a high velocity according to an electric control signal.

As described above, the air piping system 22 includes the damper-side conduit 56, atmospheric conduit 58 and vacuum conduit 62, for generating a periodic change of the air pressure in the air chamber 20 in the damper unit 10, by the switching operation of the active damping switch valve 54, so as to alternately apply a negative pressure and an atmospheric pressure to the air chamber 20. The air pressure in the air chamber 20 periodically changes at a frequency corresponding to that of the switching operation of the switch valve 54, so that the mass member 16 is accordingly oscillated.

The pressure regulating switch valve 66 is connected to the atmospheric conduit 58 communicating with the atmosphere. This pressure regulating switch valve 66 is a two-port switch valve having a first port communicating with the second port of the active damping switch valve 54, and a second port communicating with the atmosphere. The switch valve 66 is arranged to selectively connect and disconnect the first and second ports to and from each other. Preferably, the switch valve 66 is a solenoid-operated switch valve of poppet or spool type which permits a switching operation at a high velocity according to an electric control signal.

With the pressure regulating switch valve 66 being suitably controlled, the rate of flow of the atmosphere into the air chamber 20 of the damper body 10 through the atmospheric conduit 58, the switch valve 54 and the damper-side conduit 56 is regulated, whereby the pressure in the air chamber 20 is regulated by the pressure regulating switch valve 66. Accordingly, the amount of change in the air pressure in the air chamber 20 which is caused by the switching operation of the active damping switch valve 54 can be controlled as described below.

The control system is arranged to control the active damping switch valve 54 and the pressure regulating switch valve 66 depending upon the vibrating condition of the vibratile body 12, so as to provide an active damping effect with respect to the vibration of the vibratile body 12. The control system includes a computer incorporating a central processing unit (CPU) 68 which is equipped with a read-only memory (ROM) storing various control programs, and a random-access memory (RAM) for temporarily storing data for use by the CPU 68. To the CPU 68, there are connected a data map memory 70, a active damping valve driver 72 for driving the active damping switch valve 54, and a pressure regulating valve driver 74 for driving the pressure regulating switch valve 66.

The CPU 68 is adapted to receive a VIBRATING CONDITION signal R and a RUNNING CONDITION signal S. The damper unit 10 is controlled based primarily on the VIBRATING CONDITION signal R, which is preferably an electric signal having a high degree of correlation with the frequency of the vibration of the vibratile body 12 which is to be damped by the present active vibration damping device.

For instance, the vibration of the vibratile body 12 is derived from an idling operation of the engine of the vehicle, the VIBRATING CONDITION signal R is preferably a signal generated by an ignition pulse sensor or a cranking angle sensor which is mounted on the internal combustion engine. On the other hand, the RUNNING CONDITION signal S is a signal indicative of the running condition of the vehicle, which influences the phase and amplitude of the vibration of the vibratile body 12. For instance, the RUNNING CONDITION signal S may be a signal indicative of the currently selected position of a shift lever or a transmission of the vehicle, a signal indicative of the vehicle running speed, a signal indicative of the amount of operation of an accelerator pedal or the amount of opening of a throttle valve of the engine 64, or a signal indicative of a rate of air flow through the intake pipe of the engine 64.

The CPU 68 generates a first control signal P and a second control signal Q, based on the VIBRATION CONDITION and RUNNING CONDITION signals R and S, and according to data maps stored in a data map memory 70. The data maps represent relationships between the values of the signals R, S and the values of the control signals P, Q. These relationships have been determined by experiments so that the values of the control signals P, Q determined according to the relationships permit the damper unit 10 to apply to the mass member 16 an oscillating force F which is suitable to provide a high active damping effect with respect to the vibration of the vibratile body 12. The first control signal P controls the frequency and phase of the waveform of the oscillating force F such that these frequency and phase of this waveform correspond to those of the vibration of the vibratile body 12. The second control signal Q controls the magnitude of the oscillating force F such that the magnitude corresponds to the amplitude of the vibration of the vibratile body 12. The first control signal P is applied to the active damping valve driver 72, while the second control signal Q is applied to the pressure regulating valve driver 74, as indicated in FIG. 2. Based on these control signals P, Q, the valve drivers 72, 74 apply a first drive power signal P' and a second drive power signal Q' to the active damping switch valve 54 and the pressure regulating switch valve 66, respectively.

Figure 3A:
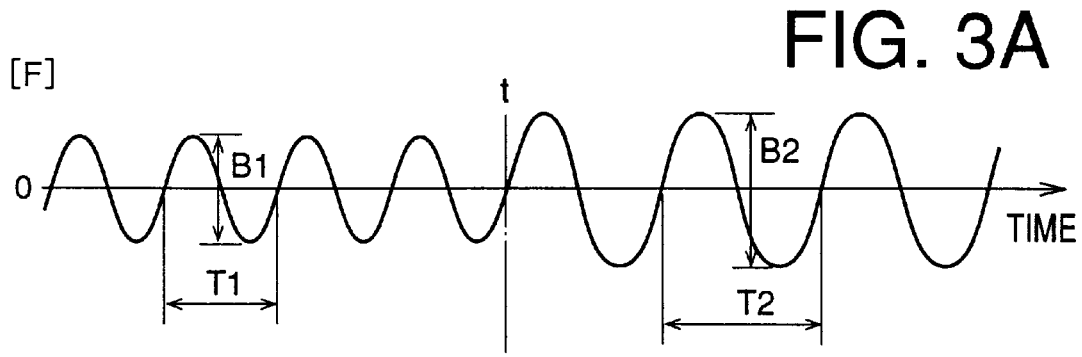
FIGS. 3A, 3B, 3C and 3D are graphs indicating waveforms of various signals used in a control system of the active vibration damping device of FIG. 1.
Figure 3B:
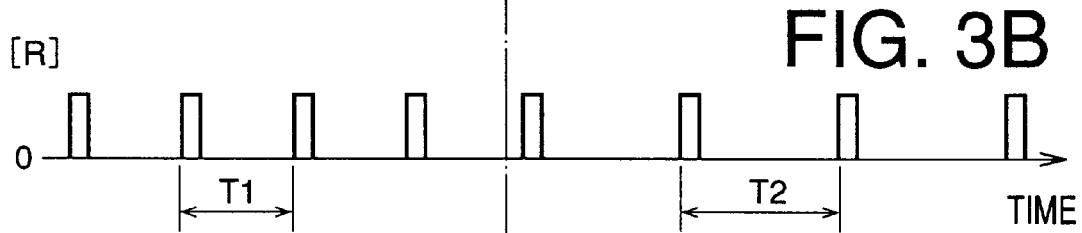
Figure 3C:
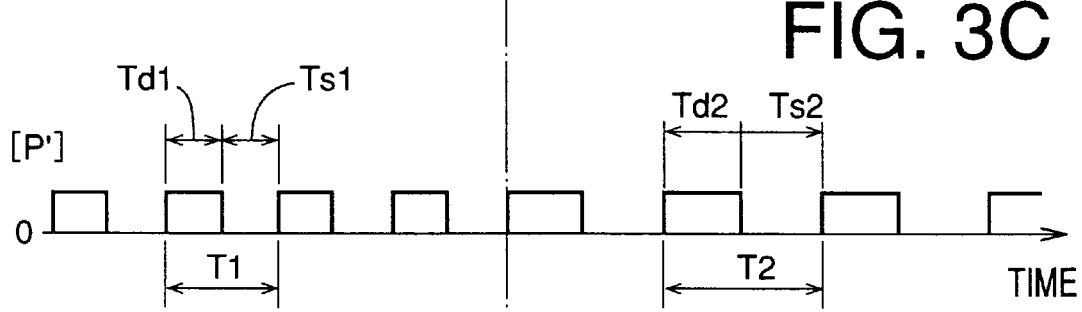

The first drive power signal P' to be applied to the active damping switch valve 54 is a pulse signal whose period T is equal to that of the waveform of the oscillating force F acting on the mass member 16. This period T is determined based on the period T of the VIBRATING CONDITION signal R which corresponds to the frequency of the vibration of the vibratile body 12 to be damped. The duty ratio of the first drive power signal P', that is, the ratio Td/T of an ON time Td to the pulse space T of the signal P' (FIG. 3C) is determined to be held within a range of 0.4–0.6, preferably to be about 0.5, even if the period, amplitude and phase of the waveform of the oscillating force F change.

It will be understood that the CPU 68, data map memory 70 and active damping valve driver 72 cooperate to constitute an active damping valve controller.

Figure 3D:
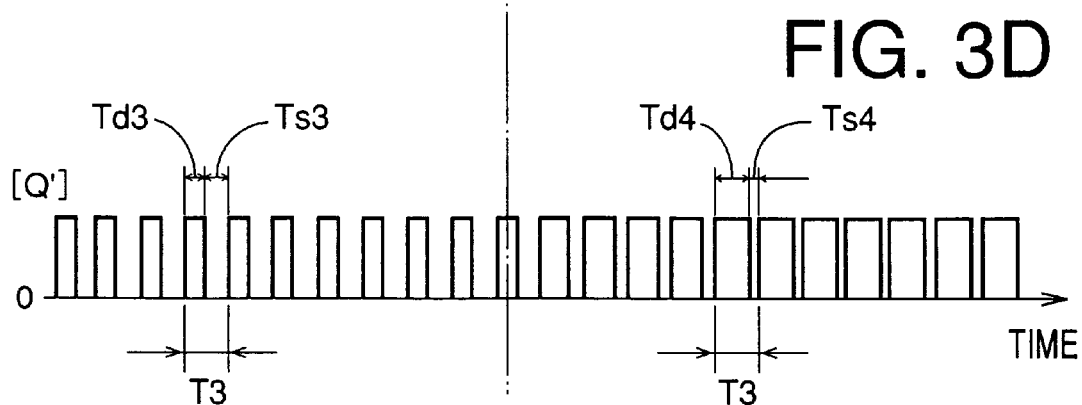

On the other hand, the second drive power signal Q' to be applied to the pressure regulating switch valve 66 is a pulse signal having a substantially constant period T3, as indicated in FIG. 3D. This period T3 does not have a relationship with the waveform of the oscillating force F acting on the mass member 16, and is shorter than the period T of the first drive power signal P'. Further, the frequency of the second drive power signal Q' is determined not to be harmonious with that of the first drive power signal P', so as to avoid periodic coincidence of the pulse rises of the two signals P', Q'. Further, the duty ratio of the second drive power signal Q', that is the ratio Td/T3 of an ON time Td to the pulse space T3 (FIG. 3D) of the signal Q' is determined depending upon the amplitude of the waveform of the oscillating force F which is required to actively damp the vibration of the vibratile body 12.

It will be understood that the CPU 68, data map memory 70 and pressure regulating switch valve 66 constitute a first pressure regulating valve controller and a second pressure regulating valve controller.

The determination of the first and second drive power signals P' and Q' will be described in more detail, with respect to a specific case where the position of the shift lever is changed during idling of the engine 64 at a point of time t indicated in FIGS. 3A–3D. In this case, the amplitude of the vibration of the vibratile body 12 changes at the point of time t from that of the engine idling vibration, so that the period T and amplitude B of the waveform of the oscillating force F which are suitable to actively damp the vibration of the vibratile body 12 accordingly change. In this case, the CPU 68 and the drivers 72, 74 determine the first and second drive power signals P' and Q', on the basis of the VIBRATING CONDITION signal R in the form of the engine ignition pulse signal and the RUNNING CONDITION signal S in the form of the shift lever position signal and the vehicle running speed signal, such that the frequency and phase of the first drive power signal P' for the active damping switch valve 54 correspond to those of the waveform of the desired oscillating force F, while the duty ratio of the second drive power signal Q' for the pressure regulating switch valve 66 corresponds to the magnitude of the desired oscillating force F (amplitude of the waveform of the oscillating force F). According to this manner of determination of the signals P', Q', the period T of the first drive power signal Pl changes from T1 to T2, at the point of time t, and the duty ratio of the second drive power signal Q' changes from Td3/T3 to Td4/T3 also at the point of time t, while the duty ratio (Td1/T1=Td2/T2) of the first drive power signal P' is kept at about 0.5, as indicated in FIGS. 13C and 13D.

With the first drive power signal P' being applied to the active damping switch valve 54, the switch valve 54 is alternately placed in an atmospheric position and a vacuum position thereof. That is, the switch valve 54 is placed for the ON time Td1, Td2 in the atmospheric position for connection of the damper-side conduit 56 to the atmospheric conduit 58 for communication of the air chamber 20 with the atmosphere, and is placed for an OFF time Ts1, Ts2 (pulse separation time) in the vacuum position for connection of the damper-side conduit 56 to the vacuum conduit 62 for communication of the air chamber 20 with the vacuum source 60. As a result, the air pressure in the air chamber 20 is periodically changed. This periodic change of the air pressure has a waveform whose frequency and phase correspond to those of the waveform of the first drive power signal P', so that the mass member 16 is oscillated with an oscillating force F whose waveform has the frequency and phase corresponding to those of the vibration of the vibratile body 12 to be damped.

With the second drive power signal Q' being applied to the pressure regulating switch valve 66, the switch valve 66 is alternately placed in an open position and a closed position thereof. That is, the switch valve 66 is placed for the ON time Td3, Td4 in the open position for communication of the atmospheric conduit 58 with the atmosphere (ambient air), and is placed for an OFF time Ts3, Ts4 in the closed position for disconnection of the atmospheric conduit 58 from the atmosphere. Since the duty ratio of the second drive power signal Q' is controlled depending upon the amplitude of the vibration of the vibratile body 12, the magnitude of the produced oscillating force F generated by the switching operation of the active damping switch valve 54 corresponds to the amplitude of the vibration of the vibratile body 12 to be actively damped.

In the present pneumatically operated active vibration damping device constructed as described above, the active damping switch valve 54 and the pressure regulating switch valve 66 are controlled to generate a periodic change of the air pressure in the air chamber 20, for oscillating the mass member 16 with an oscillating force F having a waveform whose frequency, phase and amplitude correspond to those of the vibration to be damped, whereby the damper unit 10 exhibits a high active damping effect with respect to the specific vibration of the vibratile body 12.

In particular, the first drive power signal P' determines a basic waveform of the oscillating force F, and the duty ratio of this signal P' is kept within the range between 0.4 and 0.6, so that the waveform of the oscillating force F can be made similar to a sine wave indicative of the vibration of the vibratile body 12. Accordingly, the present active vibration damping device is capable of providing an improved active vibration damping effect, while minimizing the generation of higher harmonics components of the primary frequency of oscillation of the mass member 16, that is, higher harmonics components of the frequency of the vibration to be damped, which would deteriorate the vibrating condition of the vibratile body 12.

It is also appreciated that the frequency of the second drive power signal Q' for controlling the pressure regulating switch valve 66 is considerably, higher than that of the first drive power signal P' for controlling the active damping switch valve 54. This arrangement is effective to reduce distortion of the waveform of the periodic change of the air pressure in the air chamber 20 generated by the switching operation of the switch valve 54, which distortion would otherwise take place due to the switching operation of the pressure regulating switch valve 66. Accordingly, the waveform of the oscillating force F accurately follows the waveform of the vibration to be damped. It is further appreciated that the pressure regulating switch valve 66 is located in the air piping system 22, on one of the opposite sides of the active damping switch valve 54 which is remote from the damper unit 10, making it possible to further reduce the distortion of the waveform of the periodic change of the air pressure in the air chamber 20 due to the switching operation of the switch valve 66. Accordingly, the duty ratio Td/T3 of the signal Q' for the switch valve 66 can be changed over a iso considerably wide range (between 0 and 1.0).

In the present active vibration damping device, the communication of the air chamber 20 with the atmosphere is limited by the pressure regulating switch valve 66. Accordingly, the average value of the air pressure periodically changing in the air chamber 20 is made lower (closer to the negative pressure of the vacuum source 60) than in the case where the pressure regulating switch valve 66 is not provided. Accordingly, the mass member 16 is oscillated with a compression pre-load acting on the elastic body 18, so that the spring stiffness of the vibration system consisting of the mass member 16 and the elastic body 18 is increased, whereby the operating response of the damper unit 10 is accordingly improved, permitting accurate control of the oscillating force F to be applied to the mass member 16 even when the vibration of the vibratile body 12 has a relatively high frequency. Thus, the present active vibration damping device is capable of exhibiting a high active damping effect with respect to the high-frequency vibration.

Further, the pressure regulating switch valve 66 located on the side of the active damping switch valve 54 remote from the damper unit 10 makes it possible to reduce the length of the damper-side conduit 56, that is, the distance between the switch valve 54 and the damper unit 10, so that the periodic change of the air pressure in the air chamber 20 can be efficiently induced by the switching operation of the switch valve 54 to provide a high active damping effect. This arrangement also makes it possible to increase the distance between the pressure regulating switch valve 66 and the damper unit 10, in particular, the distance between the two switch valves 54, 66 (length of the atmospheric conduit 58), so that the switching operation of the switch valve 66 does not have an adverse influence on the periodic change of the air pressure in the air chamber 20 and the waveform of the oscillating force F acting on the mass member 16, thereby improving the active damping effect to be exhibited by the present damping device.

It is also appreciated that the present active vibration damping device does not require generation of a sine wave signal corresponding to that of the vibration to be damped, for activating the damper unit 10, that is, the present device is adapted to activate the damper unit 10, using the first and second drive power signals P' and Q' which are both pulse signals, whereby the control system for the damper unit 10 is simplified in hardware and software.

It is further appreciated that the damper unit 10 utilizes the resonance of the vibration system consisting of the mass member 16 and the elastic body 18, within a frequency range near the natural frequency of the vibration system. By determining the natural frequency of this vibration system to be equal or close to the frequency of the vibration to be damped, the mass member 16 can be efficiently oscillated with a relatively small amount of periodic change of the air pressure in the air chamber 20.

In the present first embodiment, the period T3 of the second drive power signal Q' for the pressure regulating switch valve 66 is held substantially constant, even if the amplitude of the vibration of the vibratile body 12 to be damped changes. However, the period T3 can be changed. For instance, the frequency of the switching operation of the pressure regulating switch valve 66 may be changed upon changing of the period T1, T2 of the signal P' for the active damping switch valve 54 in response a change in the characteristics of the vibration to be damped, such that the frequency of the switching operation of the switch valve 66 is not harmonious with that of the switch operation of the switch valve 54. Alternatively, the frequency of the signal Q' for the switch valve 66 may be controlled by pulse width modulation, depending upon the changing characteristics of the vibration to be damped, while holding the ON time Td of the signal Q' constant. In this case, the amount of periodic change of the air pressure in the air chamber 20 and the magnitude of the oscillating force F car be controlled, depending upon the amplitude of the vibration to be damped, without controlling the duty ratio of the signal Q'.

Figure 4:
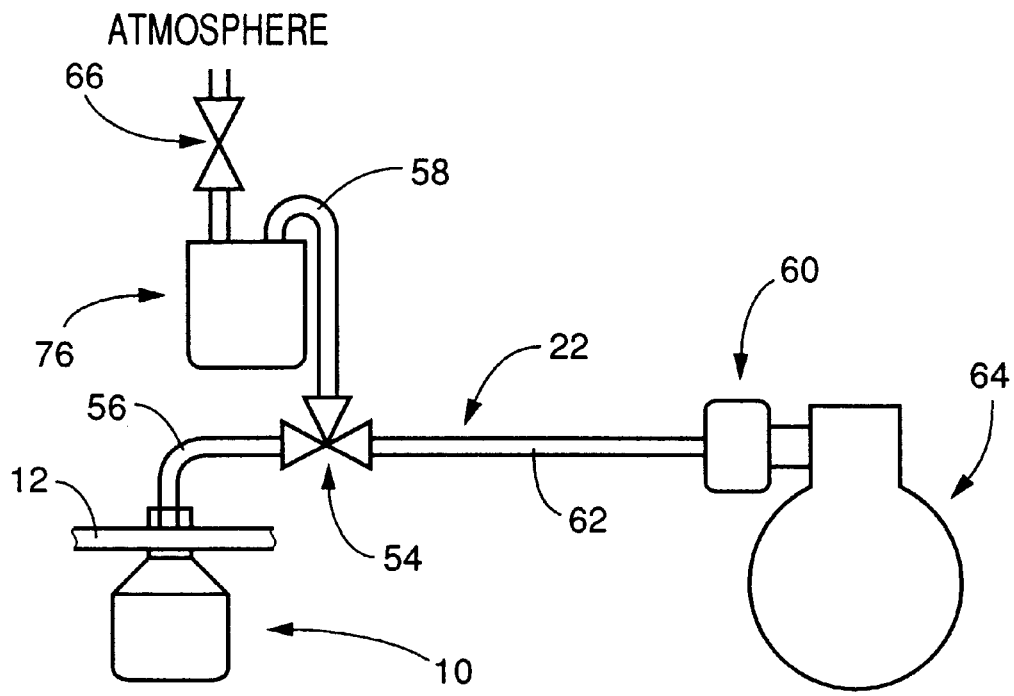
FIG. 4 is a view illustrating a pneumatic circuit of an active vibration damping device according to a second embodiment of this invention.

Referring next to FIG. 4, there will be described a second embodiment of this invention, which is a modification of the first embodiment. In the second embodiment of FIG. 4, pressure variation reducing means in the form of a surge tank 76 is connected tc a portion of the atmospheric conduit 58 between the switch valves 54, 66. The surge tank 76 may be an accumulator of a suitable type for storing a gas under pressure. However, it is desirable to determine the size (volume) and the type of the surge tank 76, depending upon the switching frequency of the active damping switch valve 54, the negative pressure applied from the vacuum source 60 to the switch valve 54, and higher harmonics components of the frequency of the vibration of the vibratile body 12 which may be generated, so as to minimize the transmission of an air pressure change due to the switching operation of the switch valve 66 to the damper unit 10 through the atmospheric conduit 53, switch valve 54 and damper-side conduit 56. That is, the surge tank 76 is provided to reduce an amount of variation of the air pressure in the air chamber 20, which may arise from the switching operation of the switch valve 66.

In the presence of the surge tank 76 which is effective to minimize or prevent the transmission of the air pressure change from the pressure regulating switch valve 66 to the damper unit 10, the air pressure ir the air chamber 20 and the oscillating force F acting on the mass member 16 can be accurately controlled by the switching operation of the active damping switch valve 54, to provide a desired active damping effect with respect to the vibration of the vibratile body 12. Further, the provision of the surge tank 76 permits the switching frequency of the pressure regulating switch valve 66 to be determined as desired, without having to take account of the harmonization with the switching frequency of the active damping switch valve 54. Accordingly, the ease of control of the switch valve 66 is enhanced. The switching frequency of the pressure regulating switch valve 66 is selected to be lower than that of the active damping switch valve 54, for example, as low as about 10 Hz.

The surge tank 76 may be replaced by any other pressure change reducing means adapted to absorb or reduce the air pressure change due to the switching operation of the pressure regulating switch valve 66, in particular, the air pressure change at the switching frequency of the switch valve 66. For instance, a known muffler nay be employed as the pressure variation reducing means, as in an active vibration damping device in a third embodiment of this invention shown in FIG. 5.

In the third embodiment, a muffler 78 of side branch type is connected to a portion of the atmospheric conduit 58 between the active damping switch valve 54 and the pressure regulating switch valve 66. This muffler 78 is a tubular structure branched from the atmospheric conduit 58 and having a suitable length L. The tubular structure is gastightly closed at its end remote from the atmospheric conduit 58. The muffler 78 is effective to reduce the air pressure variation whose frequency corresponds to the length L, based on the resonance. Thus, the length L is determined depending upon the switching frequency of the switch valve 66, so as to effectively reduce the air pressure variation caused by the switching operation of the switch valve 66. Like the serge tank 76, the muffler 78 permits accurate and stable control of the oscillating force F by the switching operation of the active damping switch valve 54, and facilitates the control of the pressure regulating switch valve 66. The muffler 78 is smaller and simpler in construction that the surge tank 76, and is accordingly available at a lower cost.

The muffler may be of any type other than the side branch type, such as a resonance muffler, a cavity muffler, an interference muffler, and a blower muffler. The resonance muffler may include a tube branched from the atmospheric conduit 58, and a resonance box provided at the free end of the tube. Alternatively, the resonance muffler includes a plurality of large-diameter portions which are spaced apart from each other in the axial direction by small-diameter portions, and is connected in series with the atmospheric conduit 58. Further alternatively, the resonance muffler includes a resonance box which encloses a part of the atmospheric conduit 58 and cooperates with this part to define therebetween an annular space, which communicates with the interior of the atmospheric conduit 58 through holes formed through the cylindrical wall of the conduit 58. The cavity type muffler uses an expansion box and is connected in series with the conduit 58. The interference muffler uses a tube which by-passes a suitable portion of the conduit 58 and which has a length larger than that of that portion of the conduit 58. When the blower type muffler is used, the conduit 58 is cut into two sections, so that an expansion box is connected to one end of one of the two sections, while one end of the other section is connected to the expansion box through a plurality of holes having a small diameter formed through the bottom wall of the expansion box.

Figure 6:
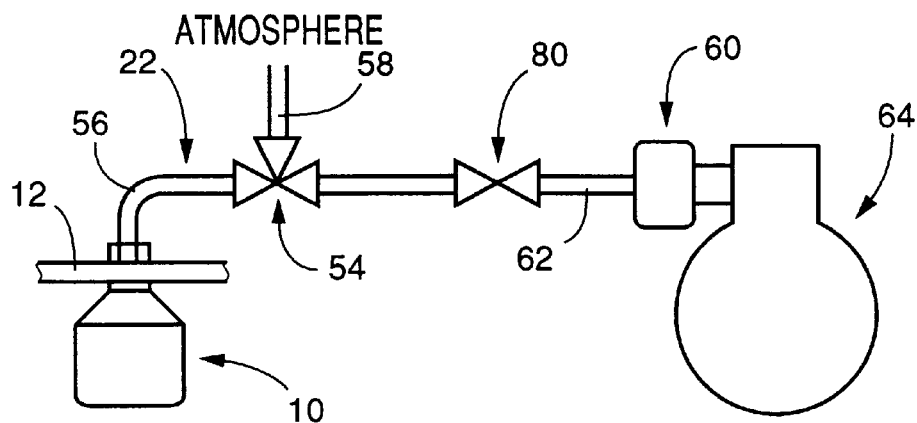
FIG. 6 is a view illustrating a pneumatically operated active vibration damping device constructed according to a fourth embodiment of this invention.

Referring next to FIG. 6, there is illustrated a pneumatically operated active vibration damping device constructed according to a fourth embodiment of this invention, wherein the damper unit 10 is identical with that in the first embodiment of FIGS. 1–3.

In the present fourth embodiment of FIG. 6, a pressure regulating switch valve 80 in the form of a two-port switch valve in the vacuum conduit 62 connecting the vacuum source 60 to the air chamber 20, rather than in the atmospheric conduit 58, so that the negative pressure is applied from the vacuum source 60 through the active damping switch valve 54 as well as the pressure regulating switch valve 80. The switch valve 80 has a first port communicating with the active damping switch valve 54, and a second port communicating with the vacuum source 60. The pressure regulating switch valve 80 identical in construction with the pressure regulating switch valve 66 in the first embodiment is preferably used in this fourth embodiment. With the duty ratio of the switch valve 30 being suitably controlled, the negative pressure to be applied from the vacuum source 60 to the air chamber 20 through the air piping system 22 is regulated, so that the magnitude of the periodic change of the air pressure in the air chamber 20 is suitably controlled.

The present pneumatically operated active vibration damping device is also adapted to control the active damping switch valve 54 and the pressure regulating switch valve 80 depending upon the characteristics of the vibration of the vibratile body 12, that is, depending upon the waveform of the vibration, so as to exhibit a high active damping effect with respect to the vibration. Principally, the manners of controlling these switch valves 54, 80 are the same as in the first embodiment. Namely, the active damping switch valve 54 is controlled according to the first drive power signal P' whose frequency and phase correspond to those of the waveform of the oscillating force F suitable to oscillate the mass member 16 for actively damping the vibration of the vibratile body 12, while the pressure regulating switch valve 80 is controlled according to the second drive power signal Q' whose duty ratio corresponds to the magnitude of the suit-able oscillating force F.

Thus, the air pressure in the air chamber 20 is periodically changed by the active damping switch valve 54, at the frequency and phase corresponding to those of the vibration of the vibratile body 12, so that the vibration can be effectively damped with the active oscillation of the mass member 16. Further, the duty ratio of the drive power signal P' for controlling the active damping switch valve 54 is held within the specified range of 0.4–0.6, irrespective of the magnitude of the oscillating force, so as to reduce or minimize the generation of higher harmonics components of the frequency of the vibration to be damped. Accordingly, the present damping device is also capable of providing a high active damping effect with excellent stability.

Figure 7:
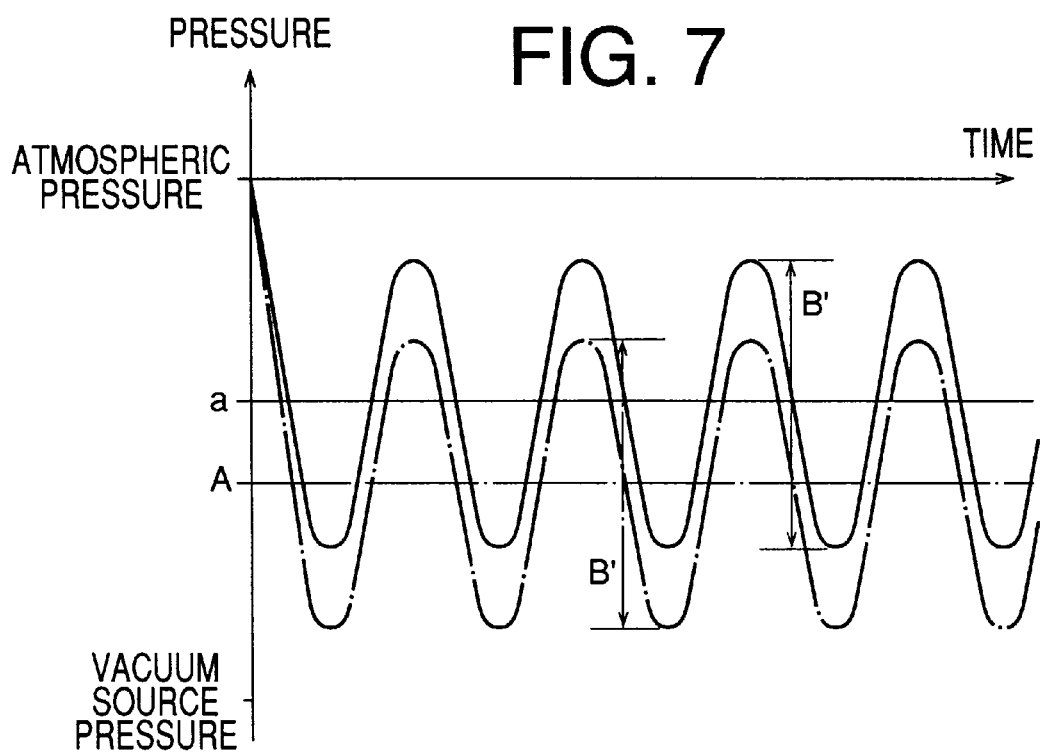
FIG. 7 is a graph showing a change in air pressure in air chamber of the damping device of FIG. 6, as compared with that of the damping device of FIG. 2.

In the present fourth embodiment wherein the communication of the vacuum source 60 with the air chamber 20 is limited by the pressure regulating switch valve 80, an average value "A" of the air pressure periodically changing in the air chamber 20 is made higher than an average value "a" in the case of the first embodiment, as indicated the graph of FIG. 7, and than in the case where the switch valve 80 is not provided. In FIG. 7, solid line represents the waveform of the periodic change of the air pressure in the present fourth embodiment, while one-dot chain line represents the waveform in the first embodiment. Accordingly, the maximum amount of strain of the elastic body 18 which is induced to obtain the desired amount B' of the periodic air pressure change (desired amplitude of oscillation of the mass member 16) is accordingly reduced, resulting in improved durability of the elastic body 18 and the damping unit 10.

Figure 5:
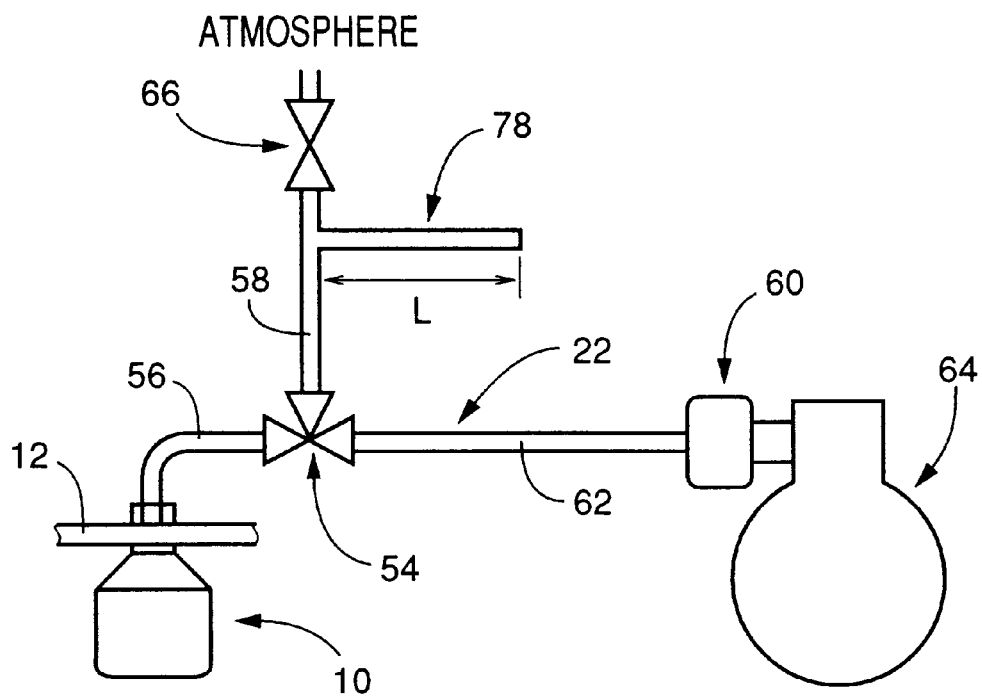
FIG. 5 is a view illustrating a pneumatic circuit of an active vibration damping device according to a third embodiment of this invention.
Figure 8:
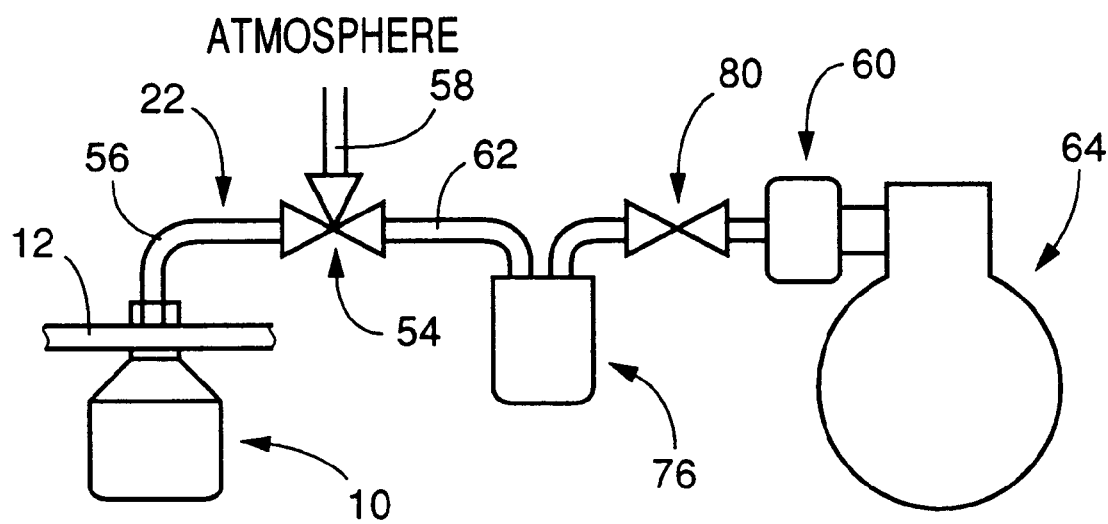
FIGS. 8, 9, 10 and 11 are views illustrating pneumatic circuits of active vibration damping devices according to fifth, sixth, seventh and eighth embodiments of this invention, respectively.
Figure 9:
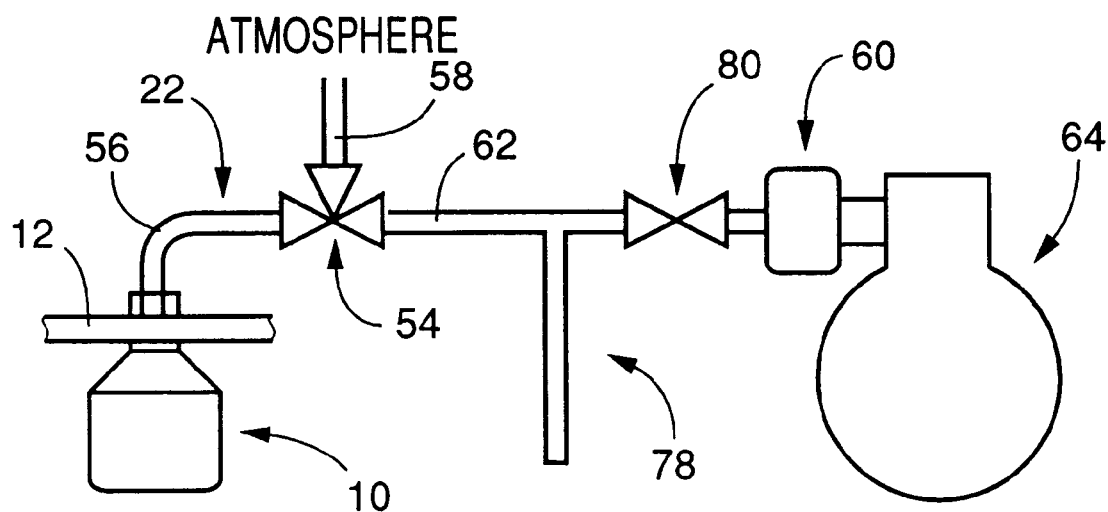

Referring to FIGS. 8 and 9, there will be described fifth and sixth embodiments of this invention. The fifth embodiment of FIG. 8 is identical with the fourth embodiment of FIG. 6, except in that the pressure variation reducing means in the form of the surge tank 76 as described above with respect to the second embodiment of FIG. 4 is connected to the vacuum conduit 62. The sixth embodiment of FIG. 9 is identical with the fourth embodiment, except in that the pressure variation reducing means in the form of the muffler 78 as described above with respect to the third embodiment of FIG. 5 is connected to the vacuum conduit 62. These surge tank 76 and muffler 78 function to reduce or prevent the transmission of the pressure change due to the switching operation of the pressure regulating switch valve 66, to the air chamber 20, resulting in improved accuracy of control of the oscillating force acting on the mass member 16.

In the embodiments of FIGS. 6, 8 and 9, the pressure regulating switch valve 80 is operated at the controlled duty ratio to alternately open and close the vacuum conduit 62 which connects the vacuum source 60 to the air chamber 20, so that the negative pressure to be applied to the air chamber 20 is suitably controlled. However, the pressure regulating switch valve 80 may be replaced by a pressure regulating switch valve 80a as in a seventh embodiment of FIG. 7, or by a pressure regulating switch valve 80b as in an eighth embodiment of FIG. 11.

Figure 10:
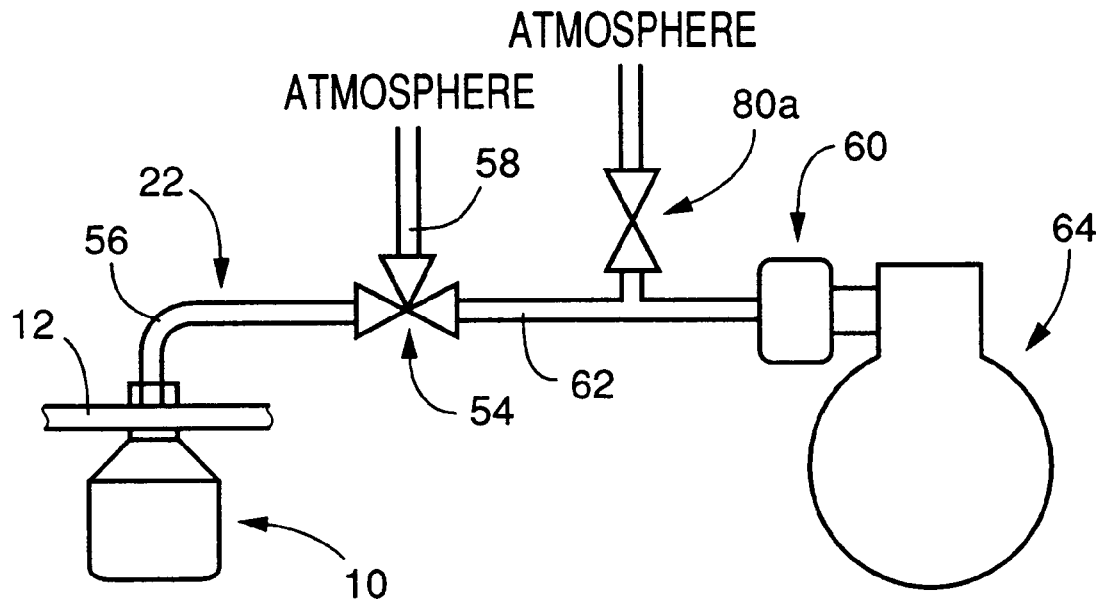

The pressure regulating switch valve 80a used in the embodiment of FIG. 10 is connected to the vacuum conduit 62 between the vacuum source 60 and the active damping switch valve 54, so as to effect selective connection or disconnection of the vacuum conduit 62 to and from the atmosphere. When the vacuum conduit 62 is open to the atmosphere through the pressure regulating switch valve 80a, the pressure to be applied from the vacuum source 60 to the air chamber 20 through the air piping system 22 is raised toward or up to the atmospheric pressure, so that the communication of the vacuum source 60 with the air chamber 20 is substantially interrupted.

Like the pressure regulating switch valve 80, the pressure regulating switch valve 80a is operated at the controlled duty ratio corresponding to the amplitude of the vibration of the vibratile body 12 to be damped, so as to cause the periodic change of the air pressure in the air chamber 20, which magnitude corresponds to the magnitude of the vibration to be damped, so that the vibration can be actively damped by the active oscillation of the mass member 16. Like the switch valve 80, the switch valve 80a is preferably a two-port solenoid-operated switch valve. Unlike the switch valve 80, the switch valve 80a substantially disconnects the vacuum source 60 from the air chamber 20 when the switch valve 80a is placed in its open position for communication with the atmosphere. Accordingly, the ON and OFF states of the pulse of the drive power signal Q' applied to the switch valve 80a are reversed with respect to those of the drive power signal Q' applied to the switch valve 80.

Figure 11:
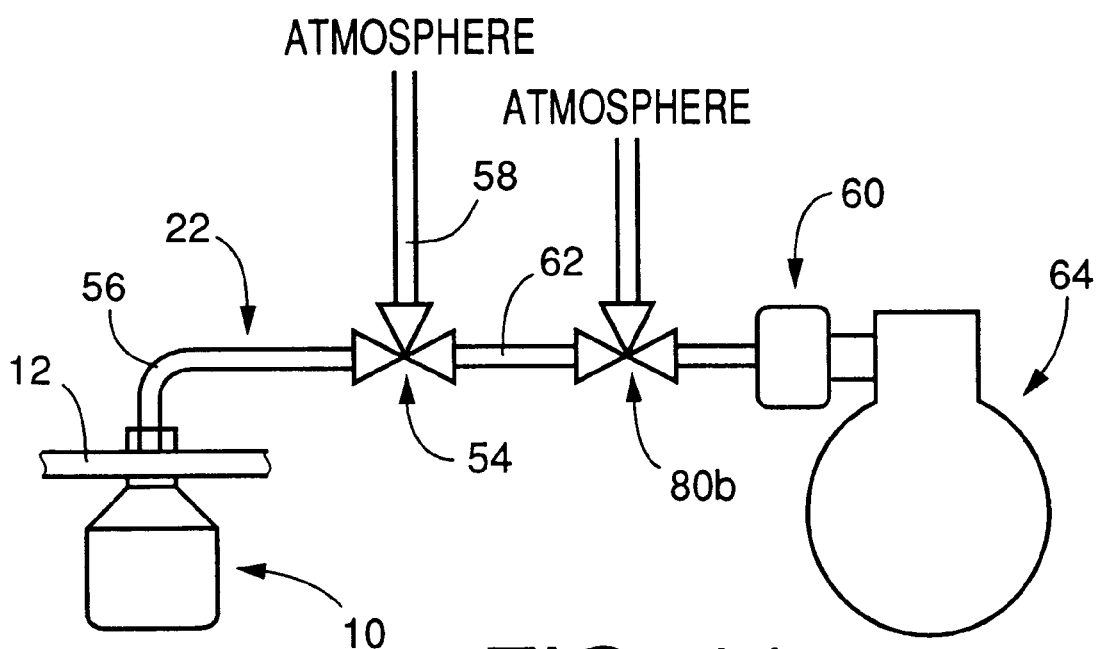

The pressure regulating switch valve 80b used in the eighth embodiment of FIG. 11 is connected to the vacuum conduit 62, for selectively connecting the air chamber 20 to the vacuum source 60 and the atmosphere. Like the active damping switch valve 54, the pressure regulating switch valve 80b is a three-port solenoid-operated switch valve, which has a first port communicating with the switch valve 54 through the vacuum conduit 62, a second port communicating with the vacuum source 60 through the vacuum conduit 61, and a third port communicating with the atmosphere. The switch valve 80b is arranged to selectively connect the first port to the second or third port. When the first port is connected to the third port, the air chamber 20 is disconnected from the vacuum source 60, and is communicated with the atmosphere.

Like the switch valve 80*a*, the duty ratio of the switch valve 80*b* is controlled according to the drive power signal Q' whose duty ratio is controlled depending upon the amplitude of the vibration to be damped. The duty ratio of the switch valve 80*b* is a ratio of the time during which the first port is held communicated with the atmosphere, to the entire period of the switching operation. Thus, the vacuum source 60 is alternately connected and disconnected to and from the air chamber 20, so that the magnitude of the periodic change of the air pressure in the air chamber 20 corresponds to the amplitude of the vibration to be actively damped by the oscillation of the mass member 16.

The construction of the damper unit of the pneumatically operated active vibration damping device according to the present invention may be is not limited to that of the damper unit 10 shown in FIG. 1, but may be modified as desired, provided that the mass member is actively damped by the periodic change cf the air pressure in the air chamber such that the period of the oscillation corresponds to that of the periodic change of the air pressure. For instance, the damper unit 10 may be replaced by a damper unit 82 shown in FIG. 12, or a damper unit 120 shown in FIG. 13.

Figure 12:
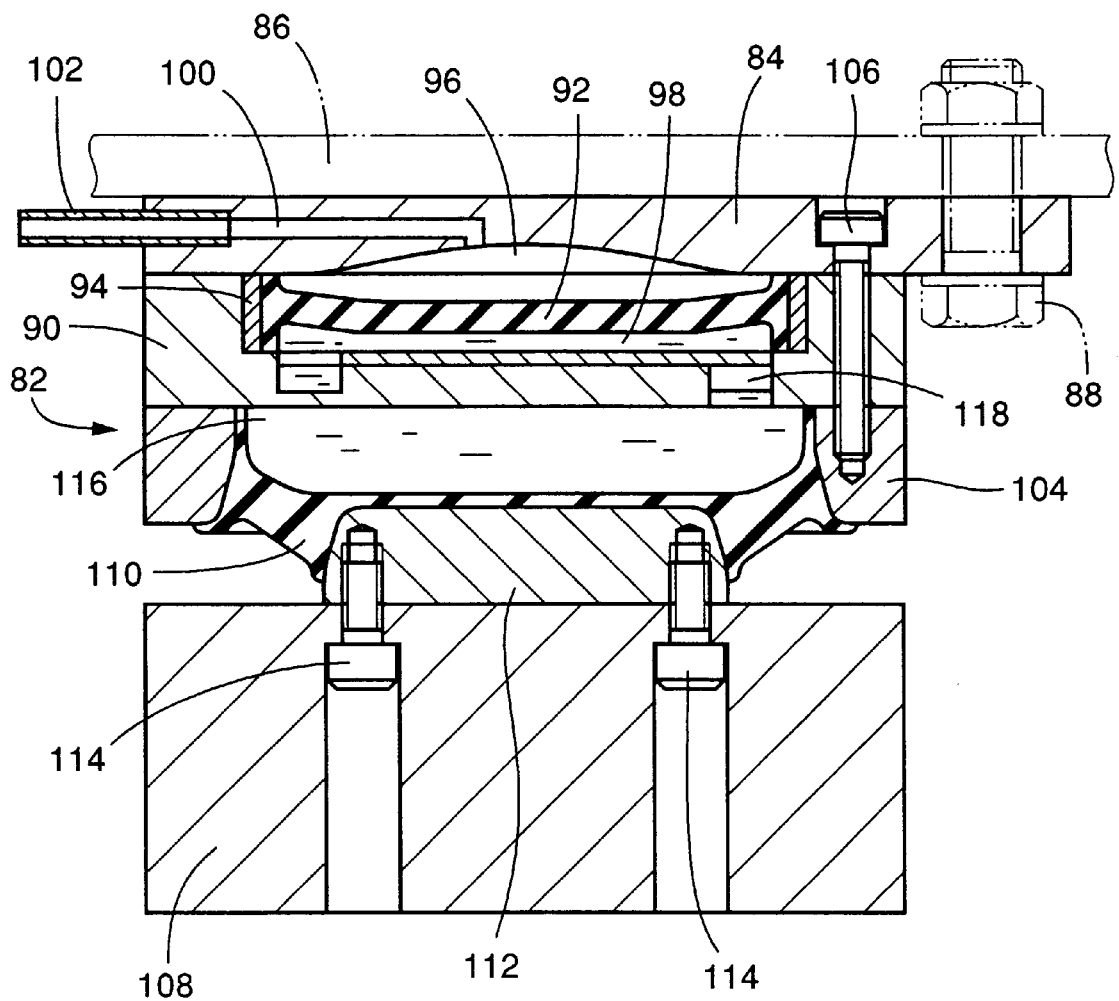
FIG. 12 is an elevational view in axial cross section of a damper unit of a pneumatically operated active vibration damping device constructed according to a ninth embodiment of this invention.

The damper unit 82 used in a ninth embodiment of FIG. 12 uses a mounting member 84 in the form of a metal plate attached by bolts 88 to a vibratile member 86 which is an object whose vibration is to be damped. On the lower surface of the mounting member 84, there is disposed a cylindrical partition member 90 which has a relatively small axial dimension and is closed at its axial end remote from the mounting member 84. The partition member 90 is secured to the mounting member 84 by fixing screws 106, such that the opening at the other end of the partition member 90 is fluid-tightly closed by the mounting member 84, so as to define a fluid-tight chamber between the mounting member 84 and the partition member 90. In this chamber, there is accommodated a metal ring 94 in pressing contact with the inner circumferential surface of the partition member 90. To the inner circumferential surface of the metal ring 94, there is bonded a circular flexible diaphragm 92 which extends in the radial direction of the partition member 90. The flexible diaphragm 92 is bonded to the metal ring 94 in the process of vulcanization of a rubber material when the flexible diaphragm 92 is formed of the rubber material. The above-indicated fluid-tight chamber is divided by the flexible diaphragm 92 into an air chamber 96 and a working liquid chamber 98. The air chamber 96 is defined by the flexible diaphragm 92 and the mounting member 84, while the working liquid chamber 98 is defined by the flexible diaphragm 92 and the partition member 90. The working liquid chamber 98 is filled with a non-compressible fluid. The mounting member 84 has an air passage 100 communicating with the air chamber 97. A connector 102 is connected at one of its opposite ends to the air passage 100, and at the other end to the air piping system 22 described above with respect to the first embodiment, so that the air pressure in the air chamber 96 is periodically changed by switching operations of active damping and pressure regulating switch valves as described above with respect to the preceding embodiments. The periodic change of the air pressure in the air chamber 96 is transmitted to the working liquid chamber 98 through the flexible diaphragm 92.

The damper unit 82 includes a cylindrical metallic mass member 108 which is spaced apart from the partition member 90 in the axial direction. The mass member 108 is supported by an elastic body 110 interposed between the partition member 90 and the mass member 108. The elastic body 110 is a generally inverted-frustoconical member which is bonded at its large-diameter end to an annular first connecting member 104, and at its small-diameter end to a disc-shaped second connecting member 112.

The partition member 90, elastic body 110 and second connecting member 112 cooperate with each other to define an oscillating liquid chamber 116 filled with the non-compressible fluid. The partition member 90 has an orifice passage 118 formed through its bottom wall, over a suitable length in its circumferential direction. The orifice passage 118 is open at one of its opposite ends to the working liquid chamber 98 and at the other end to the oscillating liquid chamber 116. The orifice passage 118 permits flows of the non-compressible fluid between the liquid chambers 98, 116. The non-compressible fluid may be selected from among water, alkylene glycol, polyalkylene glycol, silicone oil, etc. To effectively utilize the resonance of the fluid, it is preferable to use a non-compressible fluid whose viscosity is 0.1 Pa·s or lower. The liquid chambers 98, 116 may be filled with the non-compressible fluid when an assembly consisting of the first and second connecting members 104, 112 and the elastic body 110 interposed therebetween is fixes to the partition member 90 within a mass of the non-compressible fluid.

In the damper unit 82 constructed as described above, the periodic change of the air pressure in the air chamber 96 induced through the air passage 100 is transmitted to the working liquid chamber 98 through elastic deformation or displacement of the flexible diaphragm 92, and the periodic change of the fluid pressure in this working liquid chamber 98 is transmitted to the oscillating liquid chamber 116 through the orifice passage 118. As a result, the mass member 108 is alternately moved toward and away from the mounting member 84 in the axial direction with the elastic deformation of the elastic body 110, that is, oscillated in the axial direction, so that an oscillating force acting on the mass member 108 is actively applied to the vibratile member 86.

Like the damper unit 10, the damper unit 82 is capable of exhibiting a high active damping effect with respect to the vibration of the vibratile member 86, by suitably controlling the air pressure in the air chamber 96. The fluid flowing through the orifice passage 118 undergoes resonance within a frequency range which is determined by the length and cross sectional area of the orifice passage 118. This resonance of the fluid can be effectively utilized for damping the input vibration, by suitably tuning the length and cross sectional area of the orifice passage 118 depending upon the specific frequency of the input vibration.

Figure 13:
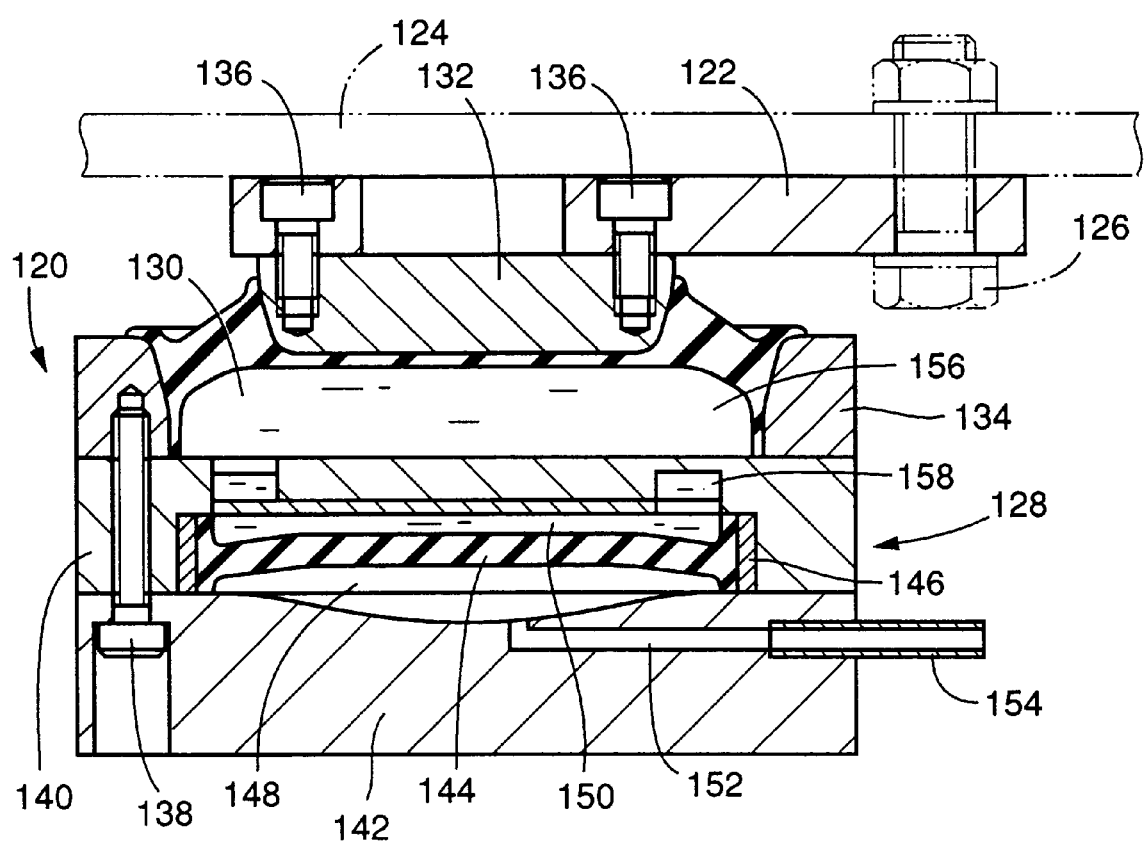
FIG. 13 is an elevational view in axial cross section of a pneumatically operated active vibration damping device constructed according to a tenth embodiment of this invention.

The damping unit 120 used in a tenth embodiment of FIG. 13 uses a mounting member 122 in the form of a metal plate, which is attached by bolts 126 to a vibratile member 124 which is an object whose vibration is to be damped. The damper unit 120 includes a cylindrical metallic mass member 128 which is spaced apart from the mounting member 122 in the axial direction. The mass member 128 is supported by an elastic body 130 interposed between the mounting member 122 and the mass member 128. The elastic body 130 is a generally inverted-frustoconical member which is bonded at its small-diameter end to a disc-shaped first connecting member 132, and at its large-diameter end to an annular second connecting member 134. The first connecting member 132 is fixed to a central portion of the lower surface of the mounting member 122 by fixing screws 136, while the second connecting member 134 is fixed to the peripheral portion of the upper surface of the mass member 128 by screws 138. The mounting member 122, first and second connecting members 132, 134 and mass member 128 are coaxial with each other. Thus, the mass member 128 is elastically connected to the mounting member 122 through the elastic body 130, so that the damper unit 12 has a vibration system consisting of a mass in the form of the mass member 128 and the second connecting member 134, and a spring in the form of the elastic body 130.

The mass member 128 consists of a cylindrical upper member 140 and a generally disc-shaped lower member 142 which are superposed on each other in the axial direction and fixed to each other by screws 138. The cylindrical upper member 140 has a small axial dimension and is closed at one of its opposite axial ends. The opening at the other end of the upper member 140 is fluid-tightly closed by the lower member 142, whereby a fluid-tight chamber is defined between the upper and lower members 140, 142 of the mass member 128. In this chamber, there is accommodated a metal ring 146 in pressing contact with the inner circumferential surface of the upper member 140. To the inner circumferential surface of the metal ring 146, there is bonded a circular flexible diaphragm 144 which extends in the radial direction of the cylindrical upper member 140. The flexible diaphragm 144 is bonded to the metal ring 146 in the process of vulcanization of a rubber material when the flexible diaphragm 144 is formed of the rubber material. The above-indicated fluid-tight chamber is divided by the flexible diaphragm 144 into an air chamber 148 and a working liquid chamber 150. The air chamber 148 is defined by the flexible diaphragm 144 and the lower member 142 of the mass member 128, while the working liquid chamber 150 is defined by the flexible diaphragm 140 and the upper member 140. The working liquid chamber 150 is filled with a non-compressible fluid. The lower member 142 has an air passage 152 communicating with the air chamber 148. A connector 154 is connected at one of its opposite ends to the air passage 152, and at the other end to the air piping system 22 described above with respect to the first embodiment, so that the air pressure in the air chamber 148 is periodically changed by switching operations of active damping and pressure regulating switch valves as described above with respect to the preceding embodiments. The periodic change of the air pressure in the air chamber 148 is transmitted to the working liquid chamber 150 through the flexible diaphragm 144. The non-compressible fluid has been described above with respect to the embodiment of FIG. 12.

The first connecting member 132, elastic body 130 and mass member 128 (upper member 140 thereof) cooperate with each other to define an oscillating liquid chamber 1156 also filled with the non-compressible fluid. The upper member 140 of the mass member 128 has an orifice passage 158 formed through its bottom wall, over a suitable length in its circumferential direction. The orifice passage 158 is open at one of its opposite ends to the working liquid chamber 150 and at the other end to the oscillating liquid chamber 156. The orifice passage 158 permits flows of the non-compressible fluid between the liquid chambers 150, 156.

Like the damper unit 82 of FIG. 12, the damper unit 120 of FIG. 13 is adapted such that the periodic change of the air pressure in the air chamber 148 induced through the air passage 152 is transmitted to the working liquid chamber 150 through elastic deformation or displacement of the flexible diaphragm 144, and the periodic change of the fluid pressure in this working liquid chamber 150 is transmitted to the oscillating liquid chamber 156 through the orifice passage 158. As a result, the mass member 128 is oscillated in the axial direction, so that an oscillating force acting on the mass member 128 is actively applied to the vibratile member 124. Thus, the damper unit 120 may also be used in place of the damper unit 10 of FIG. 1, and exhibits an excellent vibration damping effect while utilizing the fluid flows through the orifice passage 158 as well as the active oscillation of the mass member 128.

While the several presently preferred embodiments of this invention have been described above for illustrative purpose only, it is to be understood that the present invention is not limited to the details of the illustrated embodiments, but may be otherwise embodied.

For instance, the volume of the air chamber 22, 96, 148 and the spring stiffness of the elastic body 18 or flexible diaphragm 92, 144 partially defining the air chamber may be suitably determined, so as to utilize the resonance based on the compressible property of the air, for providing an improved active oscillating force acting on the mass member.

Further, a suitable biasing member such as a coil spring may be disposed in the air chamber 20 or oscillating liquid chamber 116, 156, for biasing the mass member 16, 108, 128 in the direction away from the mounting member 14, 84, 122, in order to stabilize the attitude of the mass member 16, 108, 128, and to assist the elastic body 18, 110, 130 for reducing deterioration of the operating characteristics of the elastic body due to a fatigue thereof.

The partition member 90 used in the damper unit 82 of FIG. 12 or the upper member 140 of the mass member 128 used in the damper unit 120 of FIG. 13 may be a cylindrical member without the bottom wall which separates the working liquid chamber 98, 150 and the oscillating liquid chamber 116, 156. In this case, a single liquid chamber is formed on one of the opposite sides of the flexible diaphragm 92, 144 which is remote from the air chamber 98, 148. In this case, too, the volume of the air chamber 98, 148 can be made smaller than when a liquid chamber is not provided, so that the oscillation of the mass member based on the periodic change of the air pressure in the air chamber can be controlled with a higher response.

While the active vibration damping devices according to the illustrated embodiments of this invention are adapted to actively damp the vibration of the body of an automotive vehicle, the principle of the present invention is equally applicable to a pneumatically operated active vibration damping device for actively damping the vibration of any other parts or components of the automotive vehicle, or the vibration generated in any equipment or device other than the automotive vehicle. In such a case, a vacuum tank communicating with the intake system of an internal combustion engine can be used as the vacuum source for applying a negative pressure to the air chamber, as in the illustrated embodiments. Alternatively, an exclusive vacuum pump can be used as the vacuum source.

It is to be understood that the present invention may be embodied with various other changes, modifications and improvements, which may occur to those skilled in the art, without departing from the spirit and scope of the present invention defined in the following claims:

What is claimed is:

1. A pneumatically operated active vibration damping device comprising:

a mounting member attachable to an object whose vibration is to be damped;

a mass member elastically connected to said mounting member such that said mass member can be oscillated based on a periodic change of an air pressure in an air chamber connected to an air piping system;

an active damping switch valve which is connected to said air piping system and which is operable for selective connection of said air chamber to a vacuum source and an atmosphere, to control a frequency and a phase of an oscillation of said mass member; and a pressure regulating switch valve connected to said air piping system, for alternately connecting and disconnecting said air chamber to and from said vacuum source and/or said atmosphere, so as to regulate a magnitude of said periodic change of said air pressure in said air chamber, for thereby adjusting an amplitude of said oscillation of said mass member.

2. A pneumatically operated active vibration damping device according to claim 1, wherein said pressure regulating switch valve is connected to a portion of said air piping system between said active damping switch valve and said vacuum source or said atmosphere.

3. A pneumatically operated active vibration damping device according to claim 1, further comprising an active damping valve controller for controlling a switching operation of said active damping switch valve such that the air chamber is alternately connected to said vacuum source and said atmosphere, at a frequency and phase corresponding to those of the vibration of said object, and such that a ratio of a time of connection of said air chamber to each of said vacuum source and said atmosphere, to a period of said switching operation is held within a range between 0.4 and 0.6.

4. A pneumatically operated active vibration damping device according to claim 1, further comprising a first pressure regulating switch valve controller for controlling a switching operation of said pressure regulating switch valve to alternately connect and disconnect said air chamber to and from said vacuum source and/or said atmosphere, such that a ratio of a time of communication of said pressure regulating switch valve with said vacuum source and/or said atmosphere, to a period of said switching operation of said pressure regulating switch valve changes depending upon an amplitude of the vibration of said object.

5. A pneumatically operated active vibration damping device according to claim 1, further comprising a second pressure regulating switch valve controller for controlling a switching operation of said pressure regulating switch valve such that said air chamber is alternately connected and disconnected to and from said vacuum source and/or said atmosphere, at a frequency which is higher than and is not harmonious with a frequency of a switching operation of said active damping switch valve to alternately connect said air chamber to said vacuum source and said atmosphere.

6. A pneumatically operated active vibration damping device according to claim 1, further comprising pressure variation reducing means disposed in a portion of said air piping system which is between said active damping switch valve and said pressure regulating switch valve, for reducing an amount of variation of the air pressure in said air chamber which arises from a switching operation of said pressure regulating switch valve.

7. A pneumatically operated active vibration damping device according to claim 6, wherein said pressure variation reducing means comprises a surge tank.

8. A pneumatically operated active vibration damping device according to claim 6, wherein said pressure variation reducing means comprises a muffler.

9. A pneumatically operated active vibration damping device according to claim 1, further comprising a flexible diaphragm which partially defines said air chamber and a liquid chamber on opposite sides thereof, respectively, said liquid chamber being filled with a non-compressible fluid, said periodic change of said air pressure in said air chamber causing said flexible diaphragm to be elastically oscillated, so as to cause a periodic change of a pressure of said non-compressible fluid in said liquid chamber, so that said mass member is oscillated by said periodic change of said pressure of said non-compressible fluid.

10. A pneumatically operated active vibration damping device according to claim 9, wherein said liquid chamber consists of a working liquid chamber which is partially defined by said flexible diaphragm and to which said periodic change of said air pressure in said air chamber is transmitted through said flexible diaphragm, and an oscillating liquid chamber which communicates with said working liquid chamber through an orifice passage, a periodic change of the pressure of said non-compressible fluid in said working liquid chamber being transmitted to said oscillating liquid chamber through flows of said fluid through said orifice passage, so as to cause a periodic change of the pressure of said fluid in said oscillating chamber, for thereby oscillating said mass member.

11. A pneumatically operated active vibration damping device according to claim 10, further comprising an elastic body which elastically connects said mass member to said mounting member and which partially defines said oscillating liquid chamber.

12. A pneumatically operated active vibration damping device according to claim 1, further comprising an elastic body which elastically connects said mass member to said mounting member.

13. A pneumatically operated active vibration damping device according to claim 12, wherein said elastic body and said mass member cooperate to constitute a vibration system in a damper unit which is attachable at said mounting member to said object and which has said air chamber connected to said active damping switch valve and said pressure regulating switch valve through said air piping system.

14. A pneumatically operated active vibration damping device according to claim 1, wherein said object is a body of an automotive vehicle having an internal combustion engine which provides said vacuum source.

* * * * *